United States Patent [19]

Shirai

[11] Patent Number: 5,760,936
[45] Date of Patent: Jun. 2, 1998

[54] OPTICAL LINE SWITCH DEVICE ENABLING CONNECTION OF NON-DOUBLED OPTICAL TRANSMISSION APPARATUS WITH DOUBLED BIDIRECTIONAL OPTICAL LINK

[75] Inventor: Katsuhiro Shirai, Kawasaki, Japan

[73] Assignee: Fujitsu Limited, Kanagawa, Japan

[21] Appl. No.: 674,113

[22] Filed: Jul. 1, 1996

[30] Foreign Application Priority Data

Jun. 30, 1995 [JP] Japan ................................. 7-166305

[51] Int. Cl.[6] ........................................... H04J 14/02
[52] U.S. Cl. ............................ 359/128; 359/127; 385/24
[58] Field of Search ........................ 359/110, 117, 359/127–128, 139; 385/24, 16, 31, 47

[56] References Cited

U.S. PATENT DOCUMENTS 5,194,977  3/1993  Nishio ..................................... 359/128
5,450,224  9/1995  Johansson .............................. 359/128

Primary Examiner—Kinfe-Michael Negash
Attorney, Agent, or Firm—Helfgott & Karas, P.C.

[57] ABSTRACT

An optical line switch device which contains: an optical switch which can input a transmission optical signal which is to be transmitted through one of first and second optical transmission lines, first and second optical coupling and branching units which can be connected with the first and second optical transmission lines, respectively, and an optical coupling unit which can output an input optical signal which is input from one of the first and second optical transmission lines. The transmission optical signal is supplied to one of the first and second optical coupling and branching units according to a switch control signal which is applied to the optical switch when the optical switch inputs the transmission optical signal. One of the first and second optical coupling and branching units transmits the transmission optical signal on one of the first and second optical transmission lines connected thereto when the transmission optical signal is supplied thereto. When one of the first and second optical coupling and branching units inputs an optical signal as the input optical signal, the input optical signal is suppled to the optical coupling unit. The optical coupling unit outputs the input optical signal when the input optical signal is suppled thereto.

37 Claims, 18 Drawing Sheets

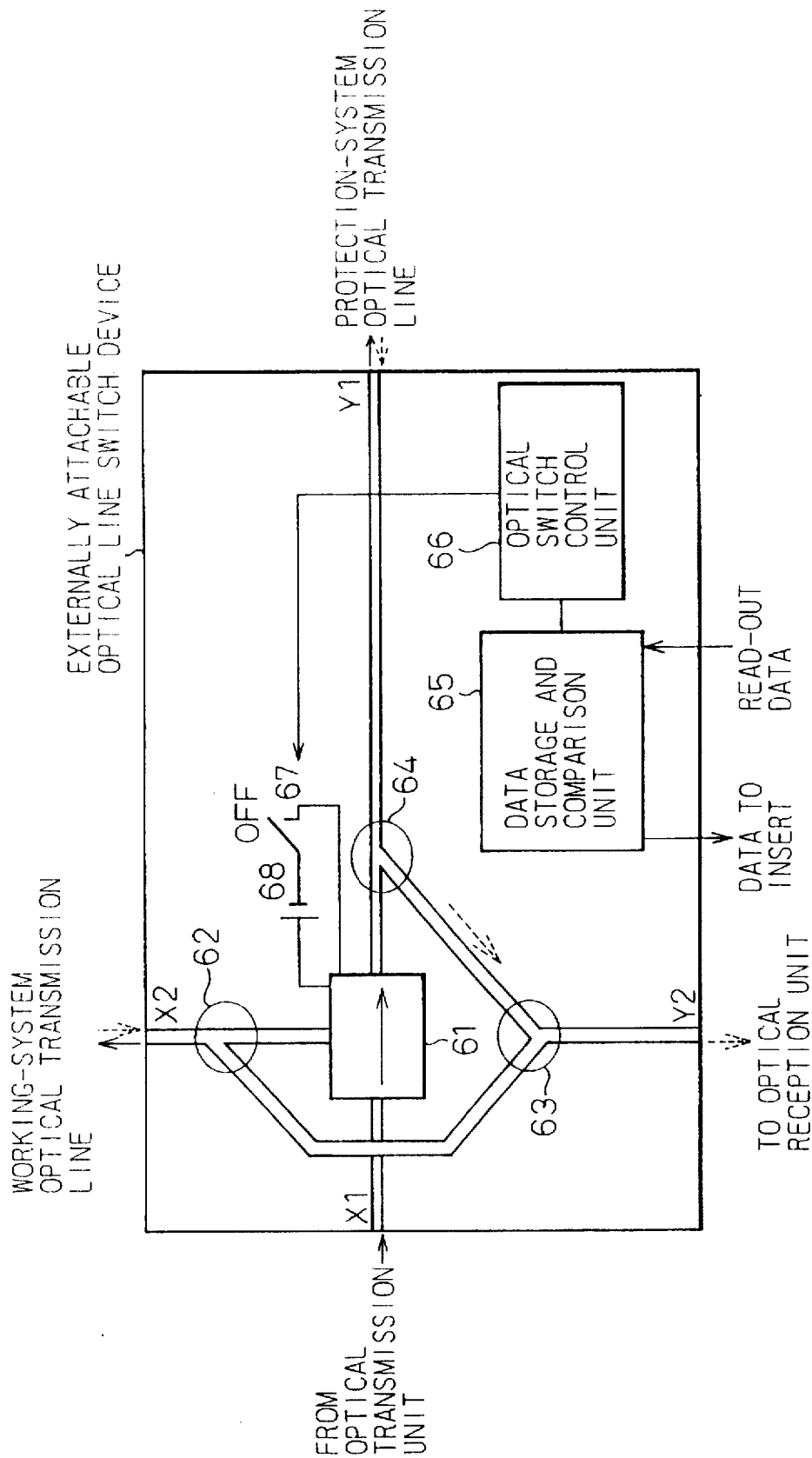

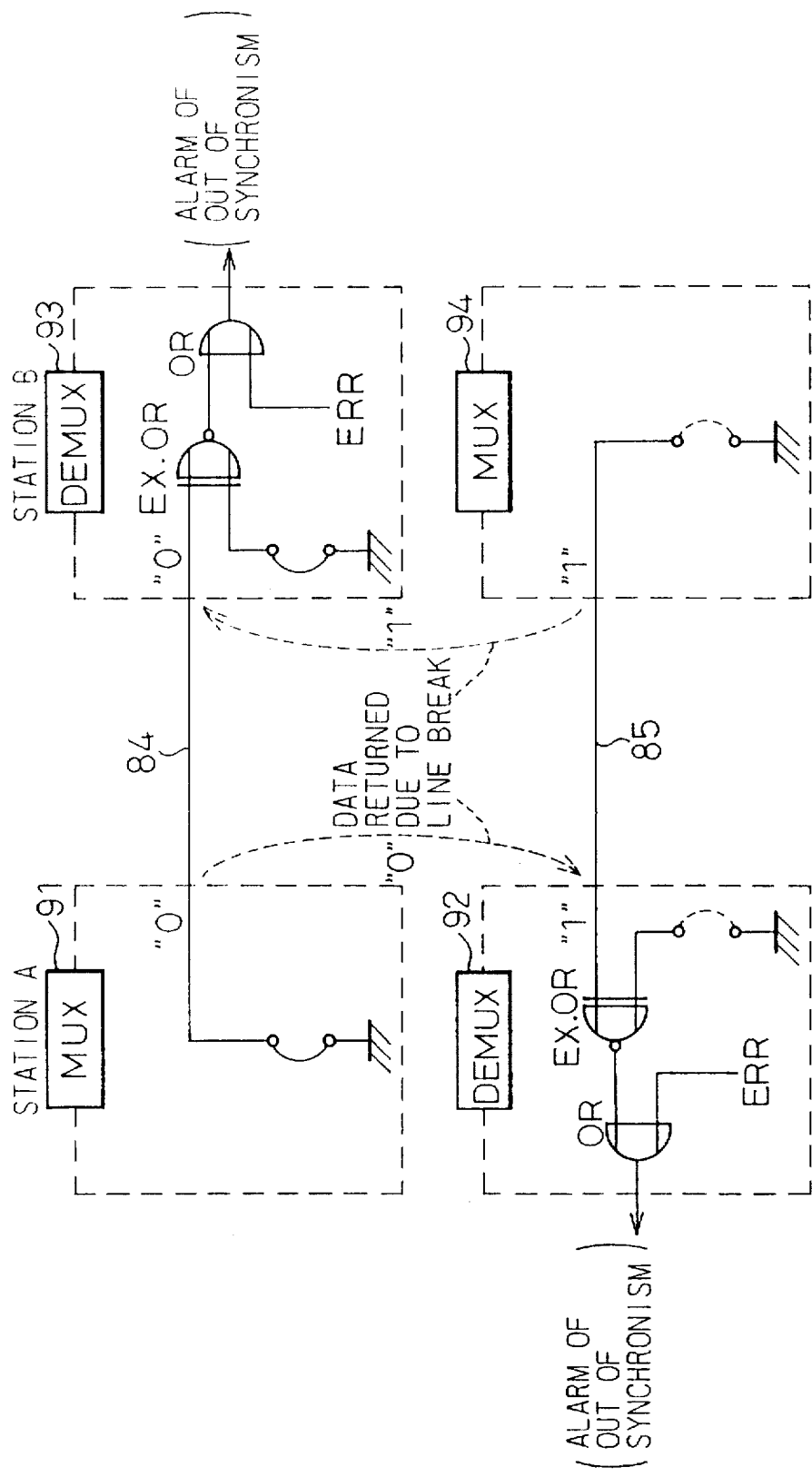

Fig.12B
PATH OVERHEAD

| Trace J1 | BIP-8 B3 | Signal Label C2 | Path Status G1 | User Channel F2 | Indicator H4 | Growth/ DQDB Z3 | Growth Z4 | Growth Z5 |
|---|---|---|---|---|---|---|---|---|

Fig.12A
TRANSPORT OVERHEAD

| Framing A1 | Framing A2 | STS-1 ID C1 |
|---|---|---|
| BIP-8 B1 | Orderwire E1 | User F1 |
| Data Com D1 | Data Com D2 | Data Com D3 |
| Pointer H1 | Pointer H2 | Pointer Action H3 |
| BIP-8 B2 | APS K1 | APS K2 |
| Data Com D4 | Data Com D5 | Data Com D6 |
| Data Com D7 | Data Com D8 | Data Com D9 |
| Data Com D10 | Data Com D11 | Data Com D12 |
| Growth Z1 | Growth/ FEBE Z2 | Orderwire E2 |

SECTION OVERHEAD | LINE OVERHEAD

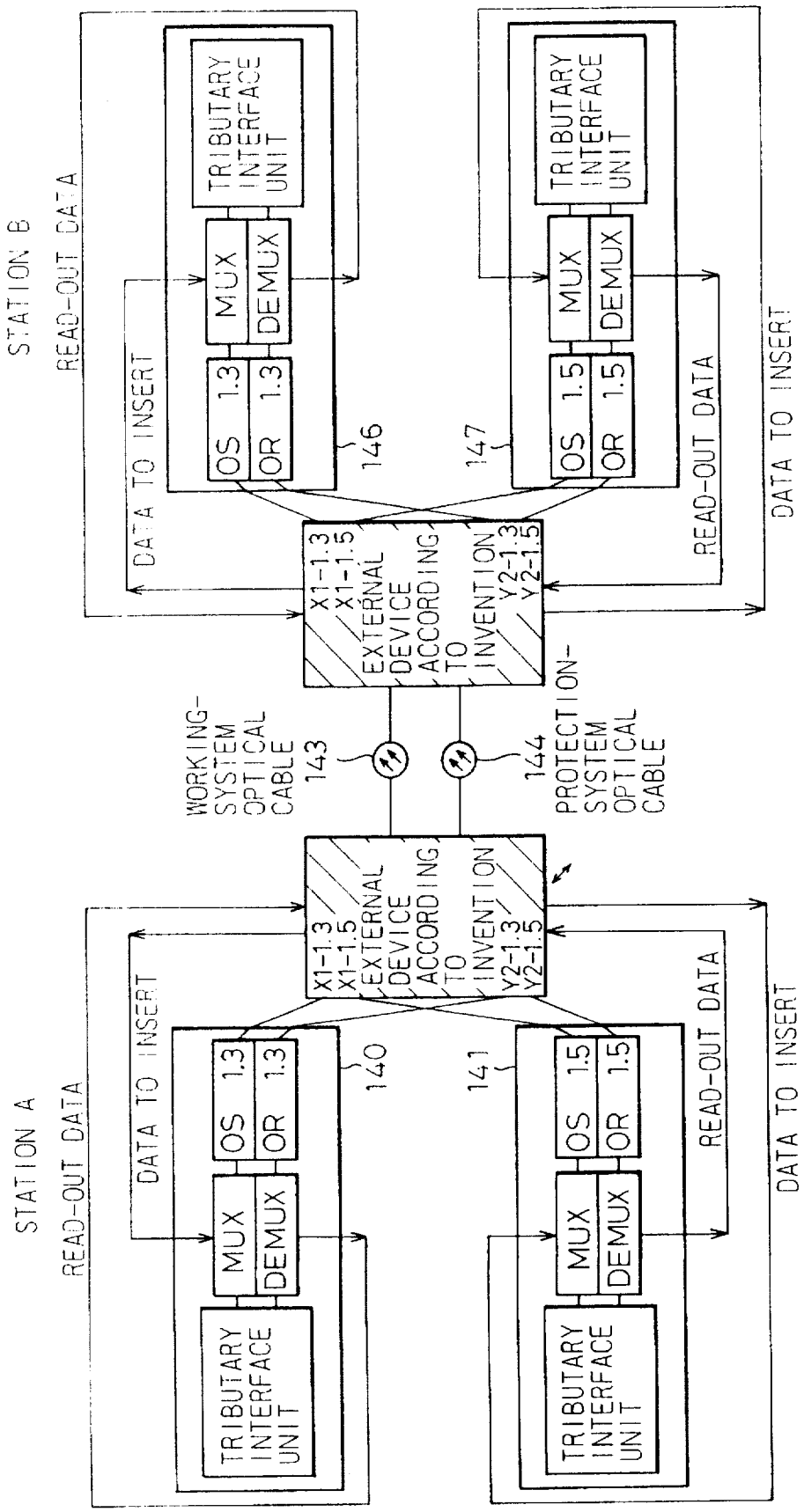

OPTICAL LINE SWITCH DEVICE ENABLING CONNECTION OF NON-DOUBLED OPTICAL TRANSMISSION APPARATUS WITH DOUBLED BIDIRECTIONAL OPTICAL LINK

BACKGROUND OF THE INVENTION (1) Field of the Invention

The present invention relates to an optical line switch device which is used in a bidirectional optical transmission system, for switching connection with an optical transmission or reception unit in an optical transmission apparatus, from one to the other of a working-system optical transmission line and a protection-system (stand-by-system) optical transmission line. The optical line switch device according to the present invention can be used in both synchronous optical communication systems and asynchronous optical communication systems. The optical line switch device according to the present invention is, in particular, useful in synchronous optical communication systems such as the SONET (Synchronous Optical Network) system in accordance with ANSI T1-105, or in the SDH system in accordance with the ITU-T recommendations, G707, G708, and G709, or in the New Synchronous Communication Network in accordance with the standard JT-G707, JT-G708, and JT-G709 by the Telecommunication Technique Committee in Japan. Hereinafter, explanations are provided based on the SONET system only since the correspondence between the SONET system and the SDH system or the New Synchronous Communication Network system in Japan is well known.

(2) Description of the Related Art

In the conventional bidirectional optical transmission systems, optical transmission apparatuses to be connected with a selected one of the working-system optical transmission line and the protection-system optical transmission line are designed to contain working-system optical transmission and reception unit to be connected with the working-system optical transmission line, and a protection-system optical transmission and reception unit to be connected with the protection-system optical transmission line. Therefore, when an optical link without a protection-system optical transmission line is upgraded to a doubled optical link with a protection-system optical transmission line, the optical transmission apparatus must be replaced with a new one designed as above to be connected to a selected one of the working-system and protection-system optical transmission lines.

SUMMARY OF THE INVENTION

A first object of the present invention is to provide an optical line switch device which enables use of a conventional optical transmission apparatus designed for use without a protection-system optical transmission line, with a doubled bidirectional optical link containing a protection-system optical transmission line, without replacing the conventional optical transmission apparatus with a new one, and the optical line switch device enables connection of the conventional optical transmission apparatus with a selected one of the working-system and protection-system optical transmission lines in the doubled bidirectional optical link.

A second object of the present invention is to provide an optical line switch device which can realize the above functions of the first object of the present invention by externally attaching it to a conventional optical transmission apparatus.

A third object of the present invention is to provide an optical line switch device which enables use of a conventional optical transmission apparatus designed for use without a protection-system optical transmission line, with a doubled bidirectional optical link containing a protection-system optical transmission line and transmitting wavelength-division-multiplexed optical signals, without replacing the conventional optical transmission apparatus with a new one, and the optical line switch device enables connection of the conventional optical transmission apparatus with a selected one of the working-system and protection-system optical transmission lines in the doubled bidirectional optical link transmitting wavelength-division-multiplexed optical signals.

(1) According to the first aspect of the present invention, there is provided an optical line switch device which contains an optical switch, first and second optical coupling and branching units, and an optical coupling unit. The optical switch can input a first optical signal, and supplies the first optical signal to one of the first and second optical coupling and branching units according to a switch control signal which is applied to the optical switch. Each of the above first and second optical coupling and branching units can output the first signal when the first optical signal is supplied thereto, can input a second optical signal, and can supply the second optical signal to the optical coupling unit. The above optical coupling unit can output the second optical signal when the second optical signal is supplied thereto.

(1-1) The optical line switch device according to the first aspect of the present invention (1-1), may be constructed as an optical line switch device which contains: an optical switch, having a first input port and first and second output ports, for inputting an optical signal through the first input port, and outputting the optical signal which is input through the first input port, through one of the first and second output ports according to a switch control signal which is applied to the optical switch; a first optical coupling and branching unit, having a second input port connected to the first output port, a third output port, and a first input and output port, for inputting an optical signal through the second input port, outputting the optical signal which is input through the second input port, through the first input and output port, inputting an optical signal through the first input and output port, and outputting the optical signal which is input through the first input and output port, through the third output port; an optical coupling unit, having a third input port connected with the third optical output port, a fourth input port, and a fourth output port, for inputting an optical signal through one of the third and fourth input ports, and outputting the optical signal which is input through the one of the third and fourth input ports, through the fourth output port; and a second optical coupling and branching unit, having a fifth output port connected with the fourth input port, a fifth input port connected with the second output port, and a second input and output port, for inputting an optical signal through the fifth input port, outputting the optical signal which is input through the fifth input port, through the second input and output port, inputting an optical signal through the second input and output port, and outputting the optical signal which is input through the second input and output port, through the fifth output port.

(1-2) The optical line switch device according to the first aspect of the present invention (1-1), may further contain a cause-of-switch detecting unit for detecting a cause which requires a path in the optical switch to switch to another path, and a switch control unit for controlling the optical switch by outputting the switch control signal in response to the detection of the cause by the cause-of-switch detecting unit.

(1-3) In the optical line switch device according to the above (1-2): each of the above first and second input and output ports may be able to be connected with an optical transmission line; the above optical line switch device may further contain a monitor signal output unit for outputting a predetermined signal as a monitor signal from the optical line switch device onto the optical transmission line; and the above cause-of-switch detecting unit may input a monitor signal transmitted through the optical transmission line, and may detect as the above cause a fact that the monitor signal input thereto is the same as the above predetermined signal.

(1-4) In the optical line switch device according to the above (1-2): each of the above first and second input and output ports may be able to be connected with an optical transmission line; the above optical line switch device may further contain a monitor signal output unit for outputting a first predetermined signal as a monitor signal from the optical line switch device onto the optical transmission line; and the above cause-of-switch detecting unit may be able to input a monitor signal which is transmitted through the optical transmission line, and may detect as the above cause a fact that the monitor signal input thereto is not a second predetermined signal which is different from the first predetermined signal.

(1-5) In the optical line switch device according to the above (1-2), the above cause-of-switch detecting unit may be able to input switch control information which indicates which path for an optical signal should be established in the optical switch, and may detect the switch control information as the above cause when the cause-of-switch detecting unit inputs the switch control information which indicates a path different from a path established until then in the optical switch.

(1-6) In the optical line switch device according to the above (1-5), the optical signal which is input through each of the first and second input and output ports may contain an overhead signal, and the above switch control information may be able to be contained in the overhead signal.

(1-7) In the optical line switch device according to the above (1-2), the above cause-of-switch detecting unit may be able to input switch control information which instructs the optical line switch device to switch the path in the optical switch to the above other path, and may detect the switch control information as the above cause when the cause-of-switch detecting unit inputs the switch control information.

(1-8) In the optical line switch device according to the above (1-7), the optical signal which is input through each of the first and second input and output ports may contain an overhead signal, and the above switch control information may be able to be contained in the overhead signal.

(1-9) In the optical line switch device according to the above (1-2): the optical signal which is input through each of the first and second input and output ports may contain an overhead signal; and the overhead signal may contain alarm information which indicates a condition of the optical transmission line through which the optical signal is transmitted; and the above cause-of-switch detecting unit may detect the alarm information as the above cause when the alarm information indicates a faulty condition of the optical transmission line.

(1-10) In the optical line switch device according to the above (1-2), the above cause-of-switch detecting unit may be able to input a loss-of-input signal which indicates that no optical signal is output from the fourth output port, and may detect as the above cause a fact that the cause-of-switch detecting unit inputs the loss-of-input signal.

(2) According to the second aspect of the present invention, there is provided an optical line switch device which contains a plurality of optical line switch units corresponding to a plurality of wavelengths, respectively, and first and second wavelength division multiplex and demultiplex units. Each of the above plurality of optical line switch units has the same construction as the optical line switch device according to the first aspect of the present invention. The above first wavelength division multiplex and demultiplex unit has a plurality of third input and output ports corresponding to the plurality of wavelengths, and a fourth input and output port. The first wavelength division multiplex and demultiplex unit inputs a plurality of first optical signals of the plurality of wavelengths through the plurality of third input and output ports, respectively, wavelength-division-multiplexes the plurality of first optical signals which are input through the plurality of third input and output ports, into a first wavelength-division-multiplexed optical signal, outputs the first wavelength-division-multiplexed optical signal through the fourth input and output port, inputs a second wavelength-division-multiplexed optical signal through the fourth input and output port, wavelength-division-demultiplexes the second wavelength-division-multiplexed optical signal into a plurality of second optical signals of the plurality of wavelengths, and outputs the plurality of second optical signals through the plurality of third input and output ports corresponding to the plurality of wavelengths of the plurality of second optical signals, respectively. The above second wavelength division multiplex and demultiplex unit has a plurality of fifth input and output ports corresponding to the plurality of wavelengths, and a sixth input and output port, inputs a plurality of third optical signals of the plurality of wavelengths through the plurality of fifth input and output ports, respectively, wavelength-division-multiplexes the plurality of third optical signals which are input through the plurality of fifth input and output ports, into a third wavelength-division-multiplexed optical signal, outputs the third wavelength-division-multiplexed optical signal through the sixth input and output port, inputs a fourth wavelength-division-multiplexed optical signal through the sixth input and output port, wavelength-division-demultiplexes the fourth wavelength-division-multiplexed optical signal into a plurality of fourth optical signals of the plurality of wavelengths, and outputs the plurality of fourth optical signals through the plurality of fifth input and output ports corresponding to the plurality of wavelengths of the plurality of fourth optical signals, respectively. Each of the above plurality of third input and output ports corresponding to one of the plurality of wavelengths, is connected to the first input and output port of one of the plurality of optical line switch units corresponding to the same one of the plurality of wavelengths. Each of the above plurality of fifth input and output ports corresponding to one of the plurality of wavelengths, is connected to the second input and output port of one of the plurality of optical line switch units corresponding to the same one of the plurality of wavelengths.

(2-1) The optical line switch device according to the second aspect of the present invention (2), may further contain a cause-of-switch detecting unit for detecting a cause which requires to switch a path in the optical switch in each of the plurality of optical line switch units to another path, and a switch control unit for controlling the optical switch in each of the plurality of optical line switch units by outputting the switch control signal in response to the detection of the cause by the cause-of-switch detecting unit.

(2-2) In the optical line switch device according to the above (2-1): each of the above fourth and sixth input and output ports may be able to be connected with an optical transmission line; the above optical line switch device may further contain a monitor signal output unit for outputting a predetermined signal as a monitor signal from the optical line switch device onto the optical transmission line; and the above cause-of-switch detecting unit may input a monitor signal transmitted through the optical transmission line, and may detect as the above cause a fact that the monitor signal input thereto is the same as the above predetermined signal.

(2-3) In the optical line switch device according to the above (2-1): each of the above fourth and sixth input and output ports may be able to be connected with an optical transmission line; the above optical line switch device may further contain a monitor signal output unit for outputting a first predetermined signal as a monitor signal from the optical line switch device onto the optical transmission line; and the above cause-of-switch detecting unit may be able to input a monitor signal which is transmitted through the optical transmission line, and may detect as the above cause a fact that the monitor signal input thereto is not a second predetermined signal which is different from the first predetermined signal.

(2-4) In the optical line switch device according to the above (2-1), the above cause-of-switch detecting unit may be able to input switch control information which indicates which path for an optical signal should be established in the optical switch, and may detect the switch control information as the above cause when the cause-of-switch detecting unit inputs the switch control information which indicates a path different from a path established until then in the optical switch.

(2-5) In the optical line switch device according to the above (2-4), the optical signal which is input through each of the fourth and sixth input and output ports contains an overhead signal, and the above switch control information can be contained in the overhead signal.

(2-6) In the optical line switch device according to the above (2-1), the above cause-of-switch detecting unit may be able to input switch control information which instructs the optical line switch device to switch the path in the optical switch in each of the plurality of optical line switch units to the above other path, and may detect the switch control information as the above cause when the cause-of-switch detecting unit inputs the switch control information.

(2-7) In the optical line switch device according to the above (2-6), the optical signal which is input through each of the fourth and sixth input and output ports may contain an overhead signal, and the above switch control information may be able to be contained in the overhead signal.

(2-8) In the optical line switch device according to the above (2-1): the optical signal which is input through each of the fourth and sixth input and output ports may contain an overhead signal; and the overhead signal may contain alarm information which indicates a condition of the optical transmission line through which the optical signal is transmitted; and the above cause-of-switch detecting unit may detect the alarm information as the above cause when the alarm information indicates a faulty condition of the optical transmission line.

(2-9) In the optical line switch device according to the above (2-1), the above cause-of-switch detecting unit may be able to input a loss-of-input signal which indicates that no optical signal is output from the fourth output port in at least one of the plurality of optical line switch units, and may detect as the above cause a fact that the cause-of-switch detecting unit inputs the loss-of-input signal.

(3) According to the third aspect of the present invention, there is provided an optical line switch device which contains a wavelength division multiplex and demultiplex unit, a plurality of optical coupling and branching units, and an optical switch. The wavelength division multiplex and demultiplex unit has a plurality of first input and output ports corresponding to a plurality of wavelengths and a second input and output port. The wavelength division multiplex and demultiplex unit inputs a plurality of first optical signals of the plurality of wavelengths through the plurality of first input and output ports, respectively, wavelength-division-multiplexes the plurality of first optical signals which are input through the plurality of first input and output ports, into a first wavelength-division-multiplexed optical signal, outputs the first wavelength-division-multiplexed optical signal through the second input and output port, inputs a second wavelength-division-multiplexed optical signal through the second input and output port, wavelength-division-demultiplexes the second wavelength-division-multiplexed optical signal into a plurality of second optical signals of the plurality of wavelengths, and outputs the plurality of second optical signals through the plurality of first input and output ports corresponding to the plurality of wavelengths of the plurality of second optical signals, respectively. The plurality of optical coupling and branching units are provided corresponding to the plurality of wavelengths, respectively. Each of the plurality of optical coupling and branching units has a third input and output port, an input port, and an output port. In each of the plurality of optical coupling and branching units, an optical signal input from the input port is output from the third input and output port, and an optical signal input from the third input and output port is output from the output port. The third input and output port of each of the plurality of optical coupling and branching units corresponding to one of the plurality of wavelengths, is connected with one of the plurality of first input and output ports corresponding to the same one of the plurality of wavelengths. The optical switch has a fourth input and output port connected with the second input and output port, and fifth and sixth input and output ports. The optical switch inputs an optical signal through the fourth input and output port, outputs the optical signal which is input through the fourth input and output port, through one of the fifth and sixth input and output ports according to a switch control signal which is applied to the optical switch. The optical switch inputs an optical signal through one of the fifth and sixth input and output ports, and outputs the optical signal which is input through one of the fifth and sixth input and output ports, through the fourth input and output port.

(3-1) The optical line switch device according to the second aspect of the present invention (3), may further contain a cause-of-switch detecting unit for detecting a cause which requires a path in the optical switch to switch to another path, and a switch control unit for controlling the optical switch by outputting the switch control signal in response to the detection of the cause by the cause-of-switch detecting unit.

(3-2) In the optical line switch device according to the above (3-1): each of the above fifth and sixth input and output ports may be able to be connected with an optical transmission line; the above optical line switch device may further contain a monitor signal output unit for outputting a predetermined signal as a monitor signal from the optical line switch device onto the optical transmission line, and the above cause-of-switch detecting unit may input a monitor signal transmitted through the optical transmission line to the optical line switch device, and may detect as the above cause a fact that the monitor signal input thereto is the same as the above predetermined signal.

(3-3) In the optical line switch device according to the above (3-1): each of the above fifth and sixth input and output ports may be able to be connected with an optical transmission line; the above optical line switch device may further contain a monitor signal output unit for outputting a first predetermined signal as a monitor signal from the optical line switch device onto the optical transmission line; and the above cause-of-switch detecting unit may be able to input a monitor signal which is transmitted through the optical transmission line to the optical line switch device, and may detect as the above cause a fact that the monitor signal input thereto is not a second predetermined signal which is different from the first predetermined signal.

(3-4) In the optical line switch device according to the above (3-1), the above cause-of-switch detecting unit may be able to input switch control information which indicates which path for an optical signal should be established in the optical switch, and may detect the switch control information as the above cause when the cause-of-switch detecting unit inputs the switch control information which indicates a path different from a path established until then in the optical switch.

(3-5) In the optical line switch device according to the above (3-4), the optical signal which is input through each of the fifth and sixth input and output ports may contain an overhead signal, and the above switch control information may be able to be contained in the overhead signal.

(3-6) In the optical line switch device according to the above (3-1), the above cause-of-switch detecting unit may be able to input switch control information which instructs the optical line switch device to switch the path in the optical switch to the above other path, and may detect the switch control information as the above cause when the cause-of-switch detecting unit inputs the switch control information.

(3-7) In the optical line switch device according to the above (3-6), the optical signal which is input through each of the fifth and sixth input and output ports may contain an overhead signal, and the above switch control information may be able to be contained in the overhead signal.

(3-8) In the optical line switch device according to the above (3-1): the optical signal which is input through each of the fifth and sixth input and output ports may contain an overhead signal; and the overhead signal may contain alarm information which indicates a condition of the optical transmission line through which the optical signal is transmitted, and the above cause-of-switch detecting unit may detect the alarm information as the above cause when the alarm information indicates a faulty condition of the optical transmission line.

(3-9) In the optical line switch device according to the above (3-1), the above cause-of-switch detecting unit may be able to input a loss-of-input signal which indicates that no optical signal is output from the output port in at least one of the plurality of optical coupling and branching units, and may detect as the above cause a fact that the cause-of-switch detecting unit inputs the loss-of-input signal.

(4) In the optical line switch devices according to the first to third aspects of the present invention, the above optical switch may be, for example, a liquid-crystal-type optical switch, or a waveguide-type optical switch.

BRIEF DESCRIPTION OF THE DRAWINGS

In the drawings:

FIG. 9 is a diagram illustrating the construction of the first embodiment of the present invention, and the paths of the optical signals when the electric switch is ON;

FIG. 10 is a diagram illustrating the construction of the first embodiment of the present invention, and the paths of the optical signals when the electric switch is OFF;

FIG. 11 is a diagram illustrating the principle of the detection of a break of an optical transmission line, by transmitting data from the transmitter side and detecting the data at the receiver side;

FIGS. 12A and 12B are diagrams illustrating the overhead channels defined in the SONET system;

FIG. 15 is a diagram illustrating the construction of the second embodiment of the present invention, and the paths of the optical signals when the electric switch is ON;

FIG. 20 is a diagram illustrating an example construction of a bidirectional optical transmission system in which the optical line switch device according to the second or third aspect of the present invention is used.

DESCRIPTION OF THE PREFERRED EMBODIMENTS

Figure 1:
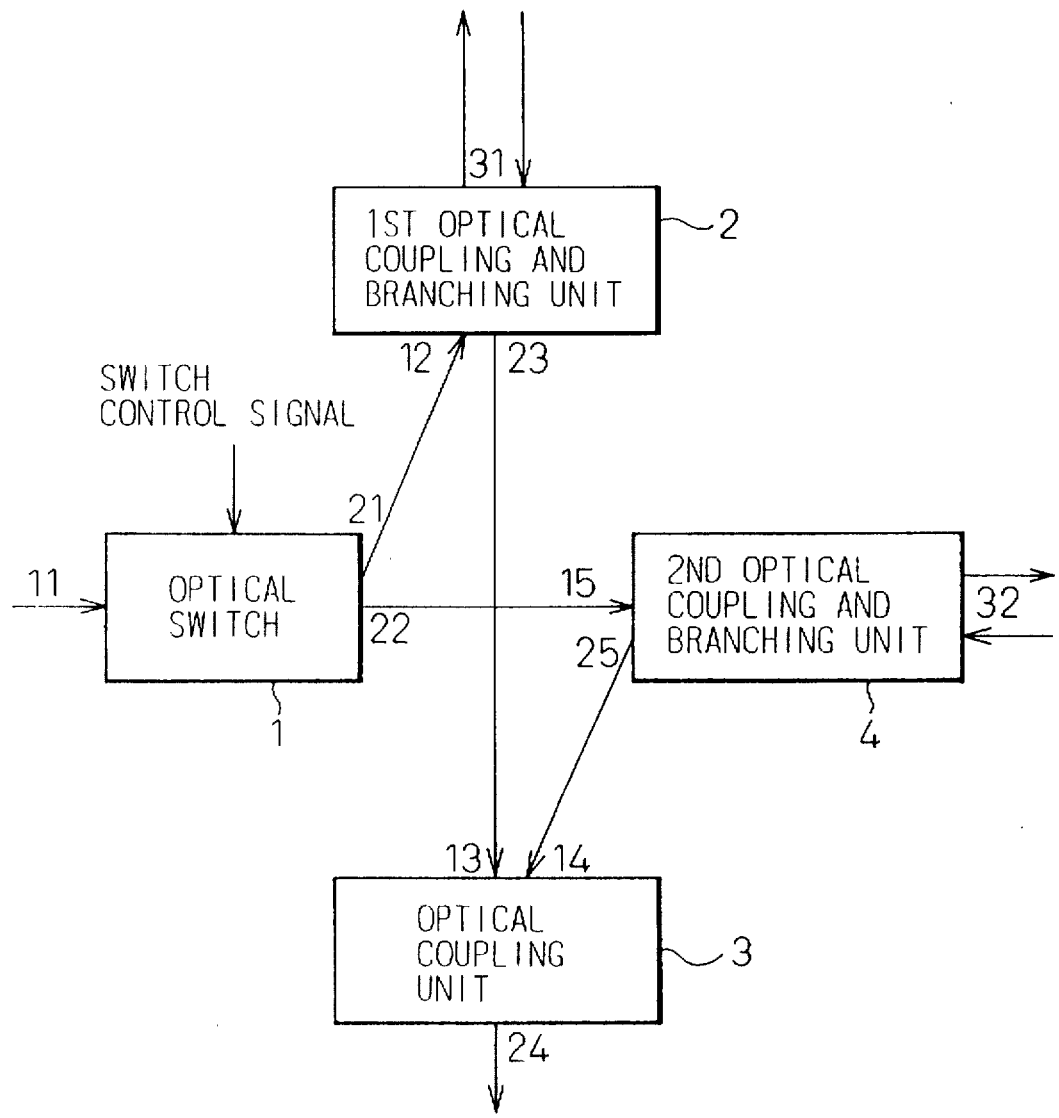
FIG. 1 is a diagram illustrating the basic construction of the first aspect of the present invention.

Basic Construction of First Aspect of Present Invention (FIG. 1)

FIG. 1 is a diagram illustrating the basic construction of the first aspect of the present invention. In the construction of FIG. 1, reference numeral 1 denotes an optical switch, 2 denotes a first optical coupling and branching unit, 3 denotes an optical coupling unit, and 4 denotes a second optical coupling and branching unit. In addition, reference numerals 11, 12, 13, 14, and 15 each denote an optical input port, 21, 22, 23, 24, and 25 each denote an optical output port, and 31 and 32 each denote an optical input and output port. The lines in FIG. 1 each indicate an optical path, and the arrows of the lines indicates the direction of the transmission of optical signals through the lines, respectively.

In the construction of FIG. 1, when an optical signal is input through the optical input port 11 of the optical switch 1, the optical signal is then output from one of the optical output ports 21 and 22 of the optical switch 1 to one of the optical input port 12 of the first optical coupling and branching unit 2 and the optical input port 15 of the second optical coupling and branching unit 4. When the optical signal is input through the optical input port 12 of the first optical coupling and branching unit 2, the optical signal is then output through the optical input and output port 31 of the first optical coupling and branching unit 2. When the optical signal is input through the optical input port 15 of the second optical coupling and branching unit 4, the optical signal is then output through the optical input and output port 32 of the second optical coupling and branching unit 4.

When an optical signal is input through the optical input and output port 31 of the first optical coupling and branching unit 2, the optical signal is then output from the optical output port 23 of the first optical coupling and branching unit 2 to the optical input port 13 of the optical coupling unit 3. When an optical signal is input through the optical input and output port 32 of the second optical coupling and branching unit 4, the optical signal is then output from the optical output port 25 of the second optical coupling and branching unit 4 to the optical input port 14 of the optical coupling unit 3. When the optical signal is input through the optical input port 13 or 14 of the optical coupling unit 3, the optical signal is then output through the optical output port 24 of the optical coupling unit 3.

In the case wherein an optical transmission apparatus (not shown) contains only an optical transmission unit and an optical reception unit without provision for a protection system, when the optical input port 11 is connected with the optical transmission unit of the optical transmission apparatus, the optical output port 24 is connected with the optical reception unit of the optical transmission apparatus, the optical input and output port 31 is connected with a working-system optical transmission line, and the optical input and output port 32 is connected with a protection-system optical transmission line, the optical transmission apparatus without provision for the protection system can be connected and used with the doubled optical transmission line containing the working-system optical transmission line and the protection-system optical transmission line.

Figure 2:
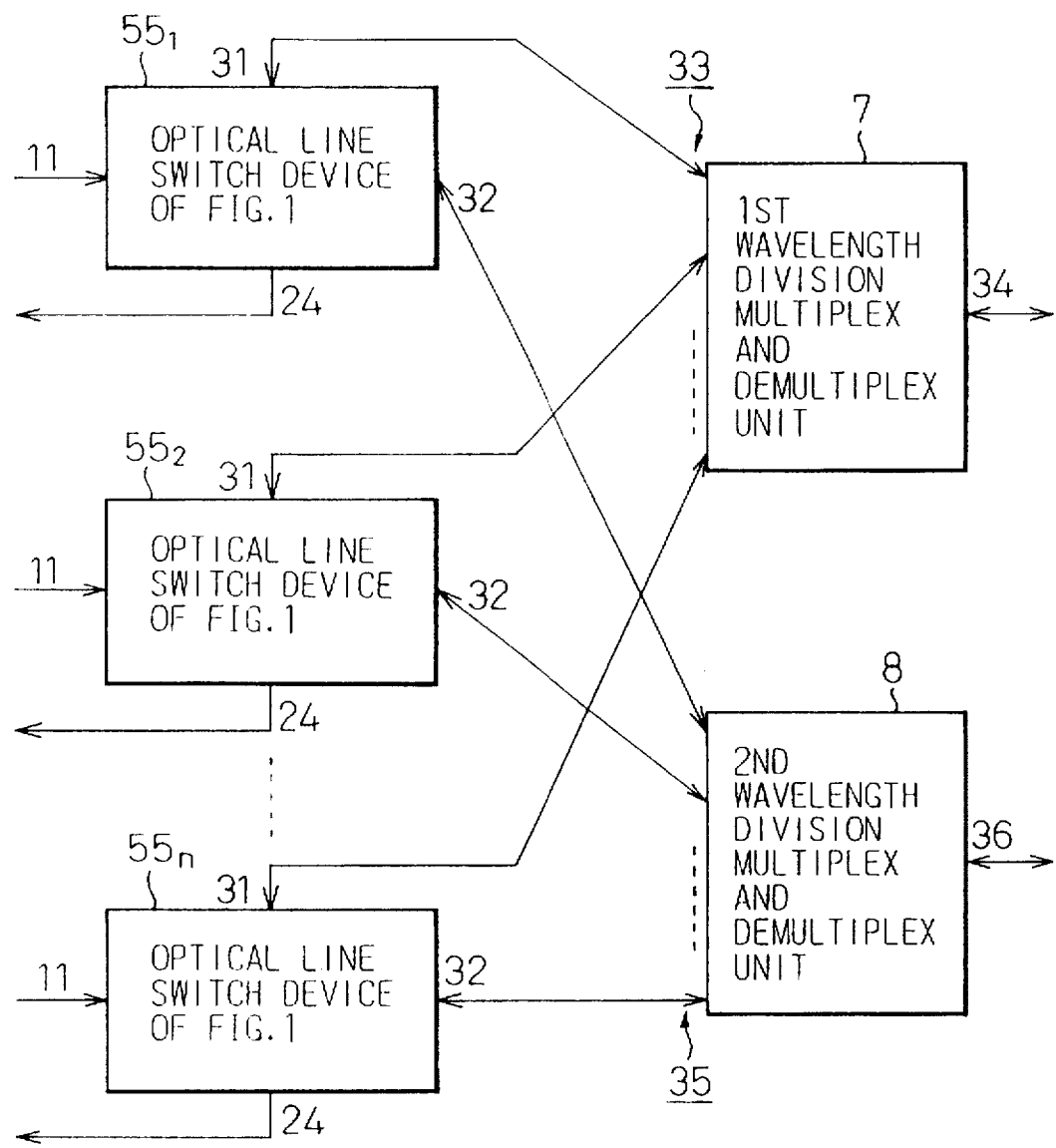
FIG. 2 is a diagram illustrating the basic construction of the second aspect of the present invention.

Basic Construction of Second Aspect of Present Invention
(FIG. 2)

FIG. 2 is a diagram illustrating the basic construction of the second aspect of the present invention. In the construction of FIG. 2, reference numerals 7 and 8 denote first and second wavelength division multiplex and demultiplex units, respectively, and $55_1$, $55_2$ . . . $55_n$ each denote an optical line switch unit having the same construction as the optical line switch device according to the first aspect of the present invention. In addition, 33 denotes a plurality of optical input and output ports (the plurality of third optical input and output ports mentioned in the "SUMMARY OF THE INVENTION") of the first wavelength division multiplex and demultiplex unit 7, 34 denotes another optical input and output port (the fourth optical input and output port mentioned in the "SUMMARY OF THE INVENTION") of the first wavelength division multiplex and demultiplex unit 7, 35 denotes a plurality of optical input and output ports (the plurality of fifth optical input and output ports mentioned in the "SUMMARY OF THE INVENTION") of the second wavelength division multiplex and demultiplex unit 8, and 36 denotes another optical input and output port (the sixth optical input and output port mentioned in the "SUMMARY OF THE INVENTION") of the second wavelength division multiplex and demultiplex unit 8. In FIG. 2, the same reference numerals as FIG. 1 are indicated for the optical input port 11, the optical output port 24, and the optical input and output ports 31 and 32 of each of the plurality of optical line switch units $55_1$, $55_2$, . . . $55_n$.

As described in the paragraph (2) in the "SUMMARY OF THE INVENTION", each of the first and second wavelength division multiplex and demultiplex units 7 and 8 has on one side a plurality of optical input and output ports corresponding to a plurality of wavelengths of optical signals, and has on the other side an optical input and output port. Each of the first and second wavelength division multiplex and demultiplex units 7 and 8 inputs a plurality of optical signals of the plurality of wavelengths through the plurality of optical input and output ports 33 or 35, respectively, and wavelength-division-multiplexes the plurality of optical signals which are input through the plurality of optical input and output ports 33 or 35 into a wavelength-division-multiplexed optical signal to output the wavelength-division-multiplexed optical signal through the optical input and output port 34 or 36. Each of the first and second wavelength division multiplex and demultiplex units 7 and 8 also inputs through the optical input and output port 34 or 36 a second wavelength-division-multiplexed optical signal, and wavelength-division-demultiplexes the second wavelength-division-multiplexed optical signal into a plurality of second optical signals of the plurality of wavelengths, respectively. The plurality of second optical signals are output through the plurality of optical input and output ports 33 or 34 for the corresponding wavelengths, respectively.

The plurality of optical line switch units $55_1$, $55_2$, . . . $55_n$ are provided corresponding to the plurality of wavelengths, respectively. The above-mentioned optical input and output port 31 of each of the plurality of optical line switch units $55_1$, $55_2$, . . . $55_n$ corresponding to one of the plurality of wavelengths is connected to one of the plurality of optical input and output ports 33, corresponding to the same wavelength, of the first wavelength division multiplex and demultiplex unit 7, and the above-mentioned optical input and output port 32 of each of the plurality of optical line switch units $55_1$, $55_2$, . . . $55_n$ corresponding to one of the plurality of wavelengths is connected to one of the plurality of optical input and output ports 34, corresponding to the same wavelength, of the second wavelength division multiplex and demultiplex unit 8.

When the optical input ports 11 of the plurality of optical line switch units $55_1$, $55_2$, . . . $55_n$ are connected with optical transmission units for the respectively corresponding wavelengths, the optical output ports 24 of the plurality of optical line switch units $55_1$, $55_2$, . . . $55_n$ are connected with optical reception units for the respectively corresponding wavelengths, the optical input and output port 34 of the first wavelength division multiplex and demultiplex unit 7 is connected with a working-system optical transmission line, and the optical input and output port 36 of the second wavelength division multiplex and demultiplex unit 8 is connected with a protection-system optical transmission line, an optical transmission apparatus containing a plurality of optical transmission units and a plurality of optical reception units for the plurality of wavelengths and having no provision for a protection system, can be connected and used with the doubled optical transmission link containing the working-system optical transmission line and the protection-system optical transmission line and transmitting wavelength-division-multiplexed signals.

Figure 3:
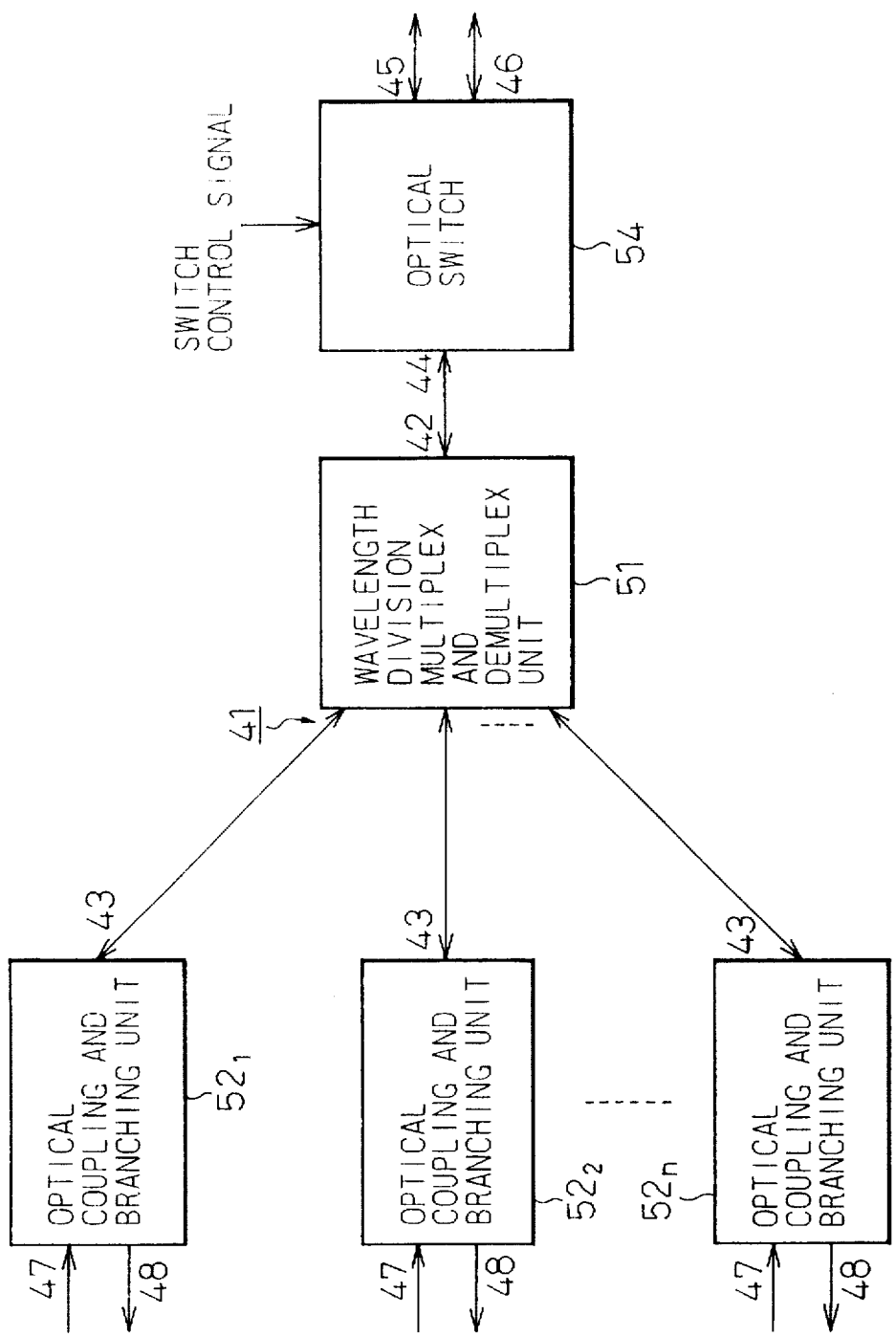
FIG. 3 is a diagram illustrating the basic construction of the third aspect of the present invention.

Basic Construction of Third Aspect of Present Invention
(FIG. 3)

FIG. 3 is a diagram illustrating the basic construction of the third aspect of the present invention. In the construction of FIG. 3, reference numeral 51 denotes a wavelength division multiplex and demultiplex unit, $52_1, 52_2, \ldots, 52_n$ each denote an optical coupling and branching unit, and 54 denotes an optical switch. The wavelength division multiplex and demultiplex unit 51 has on one side a plurality of first optical input and output ports 41 corresponding to a plurality of wavelengths, respectively, and has on the other side a second optical input and output port 42. The plurality of optical coupling and branching units $52_1, 52_2, \ldots, 52_n$ are provided corresponding to the plurality of wavelengths, respectively. Each of the plurality of optical coupling and branching units $52_1, 52_2, \ldots, 52_n$ has on one side a third optical input and output port 43, and has on the other side an optical input port 47 and an optical output port 48. The third optical input and output port 43 of each of the plurality of optical coupling and branching units $52_1, 52_2, \ldots, 52_n$ corresponding to one of the plurality of wavelengths, is connected with one of the plurality of first optical input and output ports 41, corresponding to the same one of the plurality of wavelengths, of the wavelength division multiplex and demultiplex unit 51. The optical switch 54 has on one side a fourth optical input and output port 44, and has on the other side fifth and sixth optical input and output ports 45 and 46. The fourth optical input and output port 44 of the optical switch 54 is connected with the second optical input and output port 42 of the wavelength division multiplex and demultiplex unit 51.

The wavelength division multiplex and demultiplex, unit 51 inputs a plurality of first optical signals of the plurality of wavelengths through the plurality of first input and output ports 41, respectively, and wavelength-division-multiplexes the plurality of first optical signals which are input through the plurality of first input and output port 41 into a first wavelength-division-multiplexed optical signal to output the first wavelength-division-multiplexed optical signal through the second input and output port 42. The wavelength division multiplex and demultiplex unit 51 also inputs through the second input and output port 42 a second wavelength-division-multiplexed optical signal, and wavelength-division-demultiplexes the second wavelength-division-multiplexed optical signal into a plurality of second optical signals of the plurality of wavelengths, respectively. The plurality of second optical signals are output through the plurality of first optical input and output ports 41 for the corresponding wavelengths, respectively.

The optical switch 54 inputs a wavelength-division-multiplexed optical signal through the fourth input and output port 44, outputs the wavelength-division-multiplexed optical signal which is input through the fourth input and output port 44, through one of the fifth and sixth input and output ports 45 and 46 according to a switch control signal which is applied to the optical switch 54. The optical switch 54 also inputs a wavelength-division-multiplexed optical signal through one of the fifth and sixth input and output ports 45 and 46, and outputs the wavelength-division-multiplexed optical signal which is input through one of the fifth and sixth input and output ports 45 and 46, through the fourth input and output port 44.

When the optical input ports 47 of the plurality of optical coupling and branching units $52_1, 52_2, \ldots, 52_n$ are connected with optical transmission units for the respectively corresponding wavelengths, the optical output ports 48 of the plurality of optical coupling and branching units $52_1, 52_2, \ldots, 52_n$ are connected with optical reception units for the respectively corresponding wavelengths, the optical input and output port 45 of the optical switch 54 is connected with a working-system optical transmission line, and the optical input and output port 46 of the optical switch 54 is connected with a protection-system optical transmission line, an optical transmission apparatus containing a plurality of optical transmission units and a plurality of optical reception units for the plurality of wavelengths and having no provision for a protection system, can be connected and used with the doubled optical transmission link containing the working-system optical transmission line and the protection-system optical transmission line.

Figure 4:
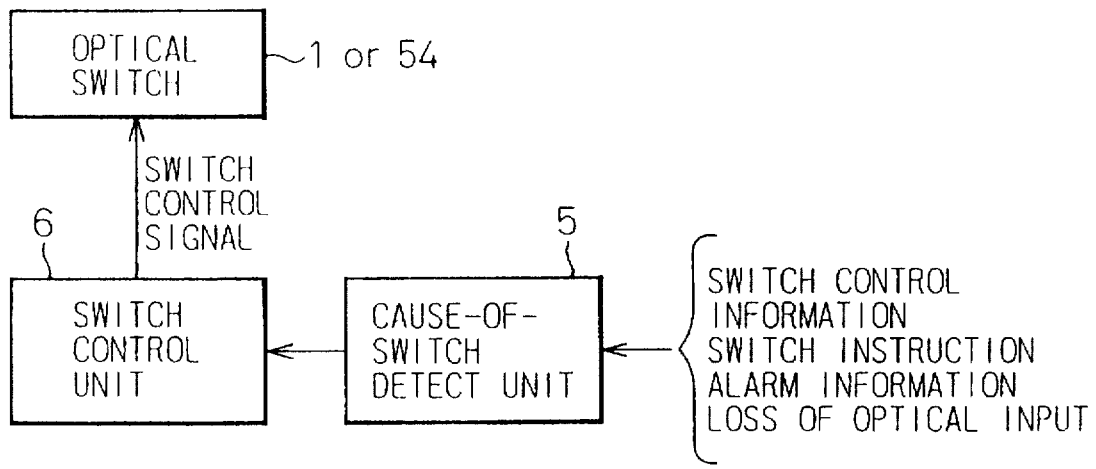
FIG. 4 is a diagram illustrating an additional construction to the first to third aspects of the present invention.
Figure 5:
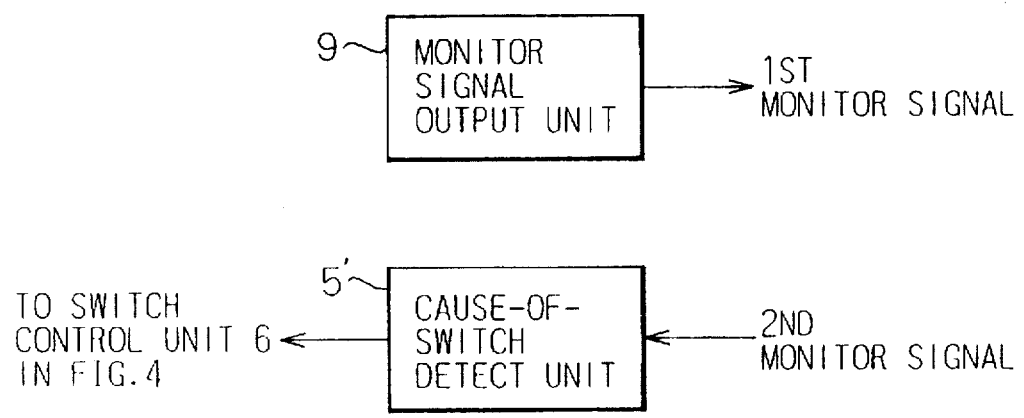
FIG. 5 is a diagram illustrating another additional construction to the first to third aspects of the present invention.

Additional Constructions to the First to Third Aspects of Present Invention
(FIGS. 4 and 5)

FIG. 4 is a diagram illustrating a construction which may be added to the above constructions according to the first to third aspects of the present invention. In FIG. 4, reference numeral 5 denotes a cause-of-switch detect unit, and 6 denotes a switch control unit.

The cause-of-switch detect unit 5 detects a cause which requires a path in the optical switch to switch to another path. The switch control unit 6 controls the optical switch in each of the constructions of FIGS. 1 to 3, by outputting the above-mentioned switch control signal, in response to the detection of the cause by the cause-of-switch detect unit 5.

When the additional construction of FIG. 5 is used, the above cause-of-switch detect unit 5 may be able to input switch control information which indicates which path for an optical signal should be established in the optical switch in the optical line switch device, and the cause-of-switch detect unit 5 may detect the switch control information as the above cause when the cause-of-switch detect unit 5 receives the switch control information which indicates a path different from a path established until then in the optical switch in each of constructions of FIGS. 1 to 3. Otherwise, the switch control information may be a switch instruction which instructs the optical line switch device to switch the path in the optical switch to the above other path.

The above optical signals which pass through the optical line switch devices of FIGS. 1 to 3 may contain an overhead signal, and the above switch control information may be able to be contained in the overhead signal. Further, in this case, the overhead signal may contain alarm information which indicates a condition of the optical transmission line through which the optical signal is transmitted; and the above cause-of-switch detect unit 5 may detect the alarm information as the above cause when the alarm information indicates a faulty condition of the optical transmission line.

In addition, the above cause-of-switch detect unit 5 may be able to input a loss-of-input signal which indicates that no optical signal is output from the fourth output port, and the cause-of-switch detect unit 5 may detect as the above cause a fact that the cause-of-switch detect unit 5 receives the loss-of-input signal.

FIG. 5 is a diagram illustrating a construction which may be added to the above constructions according to the first to third aspects of the present invention. In FIG. 5, reference numeral 5' denotes a cause-of-switch detect unit, and 9 denotes a monitor signal output unit.

When each of the above first and second input and output ports 31 and 32 of the optical line switch device of FIG. 1 are each connected with an optical transmission line, the above optical line switch device of FIG. 1 may further contain the monitor signal output unit 9 of FIG. 5. The monitor signal output unit 9 outputs a predetermined signal as a monitor signal from the optical line switch device of FIG. 1 onto the optical transmission line. In this case, the above cause-of-switch detecting unit 5' can input a monitor signal transmitted through the optical transmission line, and detects as the above cause a fact that the monitor signal input thereto is the same as the above predetermined signal. When the above optical transmission line is broken at a point, the monitor signal output from the monitor signal output unit 9 in the optical line switch device and transmitted through the optical transmission line to the break point, may be reflected at the break point and transmitted back to the cause-of-switch detecting unit 5' in the above optical line switch device. Therefore, the cause-of-switch detect unit 5' of FIG. 5 deems as a fault in the optical transmission line, the detection of the same predetermined signal as the monitor signal output from the monitor signal output unit 9 in the same optical line switch device.

When the above optical line switch device knows that a remote optical transmission apparatus which is connected to the above optical transmission line at the opposite end thereof, transmits as a monitor signal a second predetermined signal, which is different from the above predetermined signal output from the monitor signal output unit 9 in the same optical line switch device, through the optical transmission line to the above optical line switch device, the function of the above cause-of-switch detect unit 5' of FIG. 5 may be modified to detect as the above cause a fact that the monitor signal input thereto is not the second predetermined signal.

Figure 6:
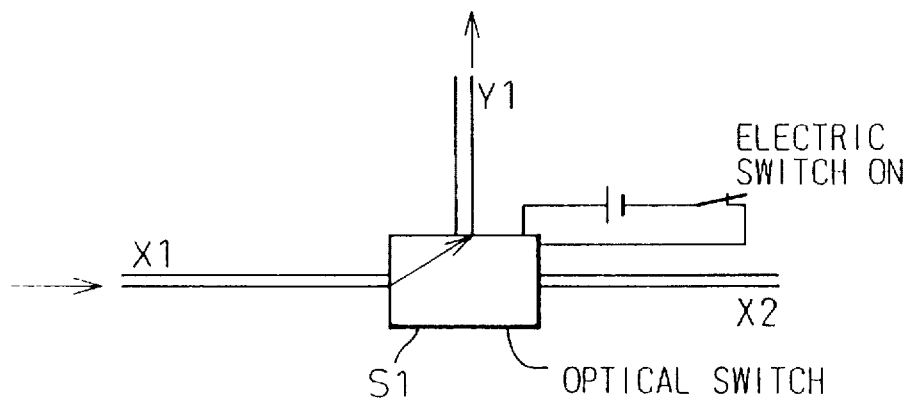
FIGS. 6 and 7 are diagrams illustrating the operation of a liquid-crystal-type optical switch.
Figure 7:
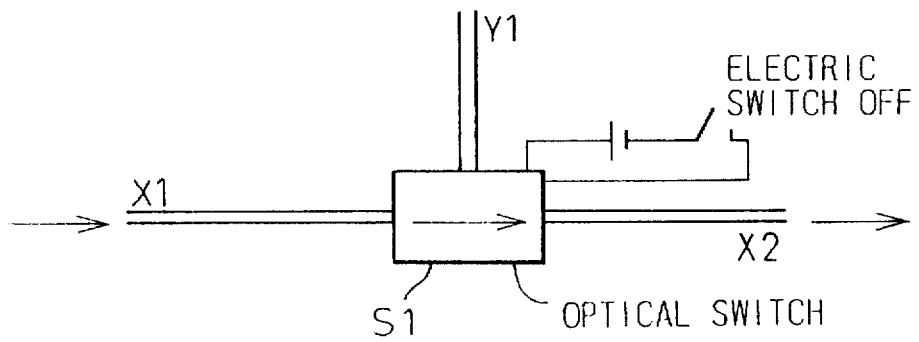
Figure 8:
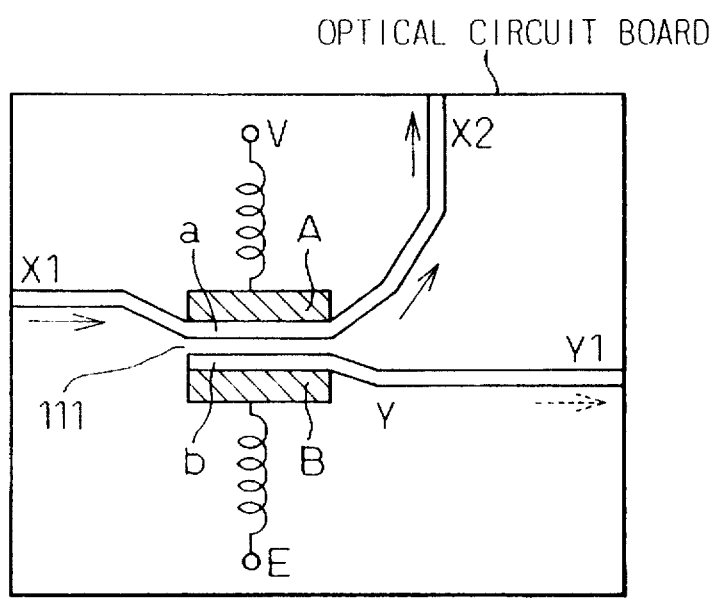
FIG. 8 is a diagram illustrating the operation of a waveguide-type optical switch.

Optical Switch
(FIGS. 6, 7, and 8)

FIGS. 6 and 7 are diagrams illustrating the operation of the liquid-crystal-type optical switch. In the liquid-crystal-type optical switch as shown in FIGS. 6 and 7, S1 denotes an optical switch, X1 denotes a first optical path, X2 denotes a second optical path, and Y1 denotes a third optical path. The optical path in the optical switch S1 can be switched between a first optical path X1→Y1, and a second optical path X1→X1, by turning the electric switch ON and OFF, as indicated in FIGS. 6 and 7.

FIG. 8 is a diagram illustrating the operation of the waveguide-type optical switch. In FIG. 8, reference numeral 111 denotes an electro-optical switch, A and B each denote an electrode, X1 denotes a first optical waveguide, X2 denotes a second optical waveguide, Y1 denotes an optical sub-waveguide, and a and b each denote an optical coupling portion. In the optical switch of FIG. 8, when no voltage is applied between the electrodes A and B, the power of the optical signal input through the first optical waveguide X1 is 100% transferred to the second optical waveguide X2. When a predetermined voltage is applied between the electrodes A and B, the power of the optical signal input through the first optical waveguide Xi is not transferred to the second optical waveguide X2, and is transferred to the optical sub-waveguide Y1.

First Embodiment
(FIGS. 9, 10, 11, 12A, and 12B)

Figure 9:
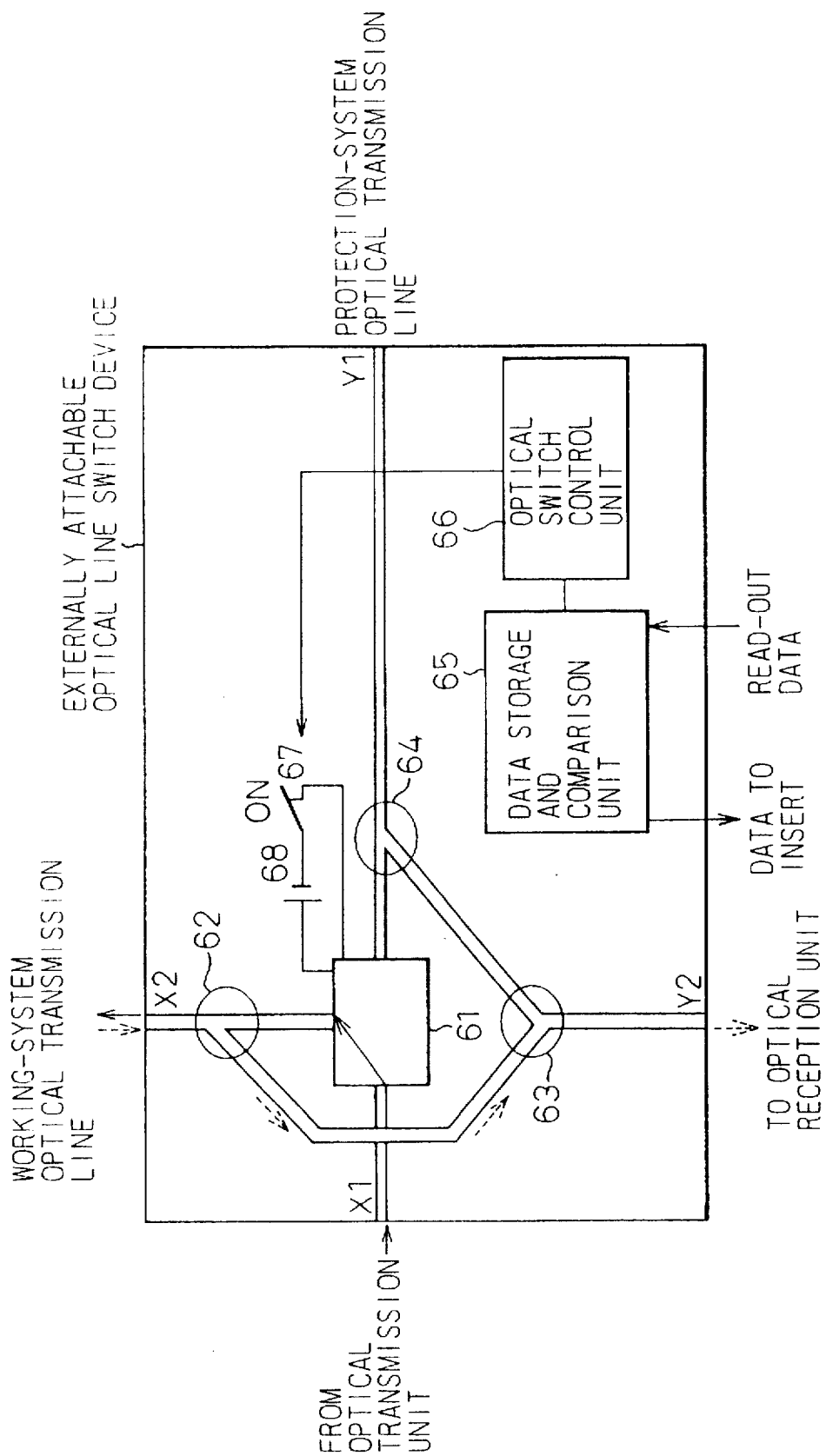

FIGS. 9 and 10 are diagrams illustrating the construction of the first embodiment of the present invention. The first embodiment realizes the first aspect of the present invention. FIG. 9 shows the paths of the optical signals when the electric switch is ON, and FIG. 10 shows the paths of the optical signals when the electric switch is OFF.

In FIGS. 9 and 10, reference numeral 61 denotes an optical switch, 62, 63, and 64 each denote an optical coupling and branching unit, 65 denotes a data storage and comparison circuit, 66 denotes an optical switch control unit, 67 denotes an electric switch, and 68 denotes a power source. In addition, X1 denotes an optical waveguide which is connected with an optical transmission unit of an optical transmission apparatus (not shown), X2 denotes an optical waveguide which is connected with a working-system optical transmission line, Y1 denotes an optical waveguide which is connected with a protection-system optical transmission line, and Y2 denotes an optical waveguide which is connected with an optical reception unit of the optical transmission apparatus.

In the construction of FIGS. 9 and 10, the portion constituted by the optical switch 61, the optical coupling and branching units 62, 63, and 64, corresponds to the optical line switch device of FIG. 1, and the optical switch 61 is controlled by the electric switch 67 as explained with reference to FIGS. 6 and 7. In addition, the data storage and comparison circuit 65 corresponds to the cause-of-switch detect unit 5 in FIG. 4, and the optical switch control unit 66 corresponds to the switch control unit 6 in FIG. 4. The data storage and comparison circuit 65 and the optical switch control unit 66 function as explained below, and these can be realized by hardware logic circuit, software executed by a processor, or any combination thereof.

As indicated by the arrows in FIGS. 9 and 10, the optical signals from the optical transmission unit are transmitted to the working-system optical transmission line when the electric switch is ON, and is transmitted to the protection-system optical transmission line when the electric switch is OFF. In addition, optical signals transmitted from the working-system optical transmission line are transmitted to the optical reception unit when the electric signal is ON, and optical signals transmitted from the protection-system optical transmission line are transmitted to the optical reception unit when the electric signal is OFF.

FIG. 11 is a diagram illustrating the principle of detection of a break of a bidirectional optical transmission line, by transmitting data from the transmitter side and detecting the data at the receiver side. As indicated in FIG. 11, a first predetermined value, for example, "0", as a first line break detection data, is inserted into a predetermined timeslot of a multiplexed signal to be transmitted from the station A to the station B through the bidirectional optical transmission line, by the multiplexer 91 in the station A, and the multiplexed signal is transmitted to the station B. In the station B, the data in the above timeslot is extracted by the demultiplexer 93, and the extracted data is examined with regard to whether or not the extracted data is the same as the above first predetermined value "0", for example, by using an exclusive OR circuit. In parallel to the above, a second predetermined value which is different from the above first predetermined value, for example, "1", as a second line break detection data, is inserted into a predetermined timeslot of a multiplexed signal to be transmitted from the station B to the station A through the bidirectional optical transmission line, by the multiplexer 94 in the station B, and the multiplexed signal is transmitted to the station A. In the station A, the data in the above timeslot is extracted by the demultiplexer 92, and the extracted data is examined with regard to whether or not the extracted data is the same as the above second predetermined value "1", for example, by using an exclusive OR circuit.

When the above bidirectional optical transmission line is broken at a point on the bidirectional optical transmission line, the multiplexed signal transmitted from the station A will be reflected at the break point, and be transmitted back to the station A, and the station A will receive the multiplexed signal which is transmitted from the station A. Therefore, the station A will not detect in the above predetermined timeslot the above second predetermined value "1" from the station B, and will detect the above first predetermined value "0" which is inserted by the station A itself. In addition, the station B will not detect in the above predetermined timeslot the above second predetermined value "0" from the station A, and will detect the above second predetermined value "1" which is inserted by the station B itself. Thus, an alarm signal, for example, an alarm of out-of-synchronism, is generated at both the stations A and B as a result of the above examination.

For example, in the SONET system, the SDH system, or the new synchronous transmission system in Japan, unused channels in the line overhead (LOH) channels can be used as the above timeslot. The overhead channels defined in the SONET system are indicated in FIGS. 12A and 12B. Currently available optical transmission apparatuses designed for the SONET system, the SDH system, or the new synchronous transmission system in Japan, are equipped with an external terminal (connector) for enabling access to the above unused channels from outside the optical line switch device. Therefore, the above data storage and comparison unit 65 of FIGS. 9 and 10 can be connected to this external terminal.

The above data storage and comparison unit 65 operates as follows.

(1) To insert the line break detection data into an LOH channel in a transmission frame which is to be transmitted from the optical transmission apparatus to which the optical line switch device according to the present invention is attached, where the line break detection data should be different from another line break detection data which will be inserted into an LOH channel in a transmission frame which is to be transmitted from the opposite optical transmission apparatus which is located at the opposite end of the optical transmission line.

(2) To store the above inserted line break detection data in the data storage and comparison unit 65.

(3) To continuously read an LOH channel in every transmission frame received at the optical transmission apparatus to which the optical line switch device according to the present invention is attached, and compare line break detection data contained in the LOH channel read from the received transmission frame, with the above line break detection data which is inserted by and stored in the data storage and comparison unit 65.

In the case of a line break, the transmitted optical signal will be reflected at the break point, and will be transmitted back to the optical transmission apparatus from which the reflected transmission optical signal is transmitted, and the above compared line break detection data become the same.

(4) When the above compared data are detected to be the same, i.e., a line break is detected, this detection is informed to the optical switch control unit 66. When the optical switch control unit 66 is informed of the detection of the line break, the optical switch control unit 66 turns OFF the electric switch 67 for the optical switch 61 in the construction of FIGS. 9 and 10.

According to the above operations, when the above compared data are not the same, i.e., when no line break is detected, the optical switch 61 is ON as indicated in FIG. 9, and therefore optical signals from the optical transmission unit is transmitted through the optical waveguide X1, the optical switch 61, the optical coupling and branching unit 62, and the optical waveguide X2 to the working-system optical transmission line, and optical signals from the working-system optical transmission line is transmitted through the optical waveguide X2, the optical coupling and branching units 62 and 63 and the optical waveguide Y2 to the optical reception unit. Namely, the working-system optical transmission line is linked to the optical transmission unit and the optical reception unit. In this case, at the optical coupling and branching unit 62, a very small amount of the optical signal from the optical waveguide X1 leaks to the optical waveguide Y2. Usually, the cross talk strength of the optical coupling and branching unit 62 is 50 dB.

As described above, when the above compared data are the same, i.e., when a line break is detected, the optical switch 61 is turned OFF as indicated in FIG. 10, and therefore optical signals from the optical transmission unit is transmitted through the optical waveguide X1, the optical switch 61, the optical coupling and branching unit 64, and the optical waveguide Y1 to the protection-system optical transmission line, and optical signals from the protection-system optical transmission line is transmitted through the optical waveguide Y1, the optical coupling and branching units 64 and 63 and the optical waveguide Y2 to the optical reception unit. Namely, the protection-system optical transmission line is linked to the optical transmission unit and the optical reception unit. In this case, at the optical coupling and branching unit 64, a very small amount of the optical signal from the optical waveguide X1 leaks to the optical waveguide Y2. Usually, the cross talk strength of the optical coupling and branching unit 64 is also 50 dB.

Figure 13:
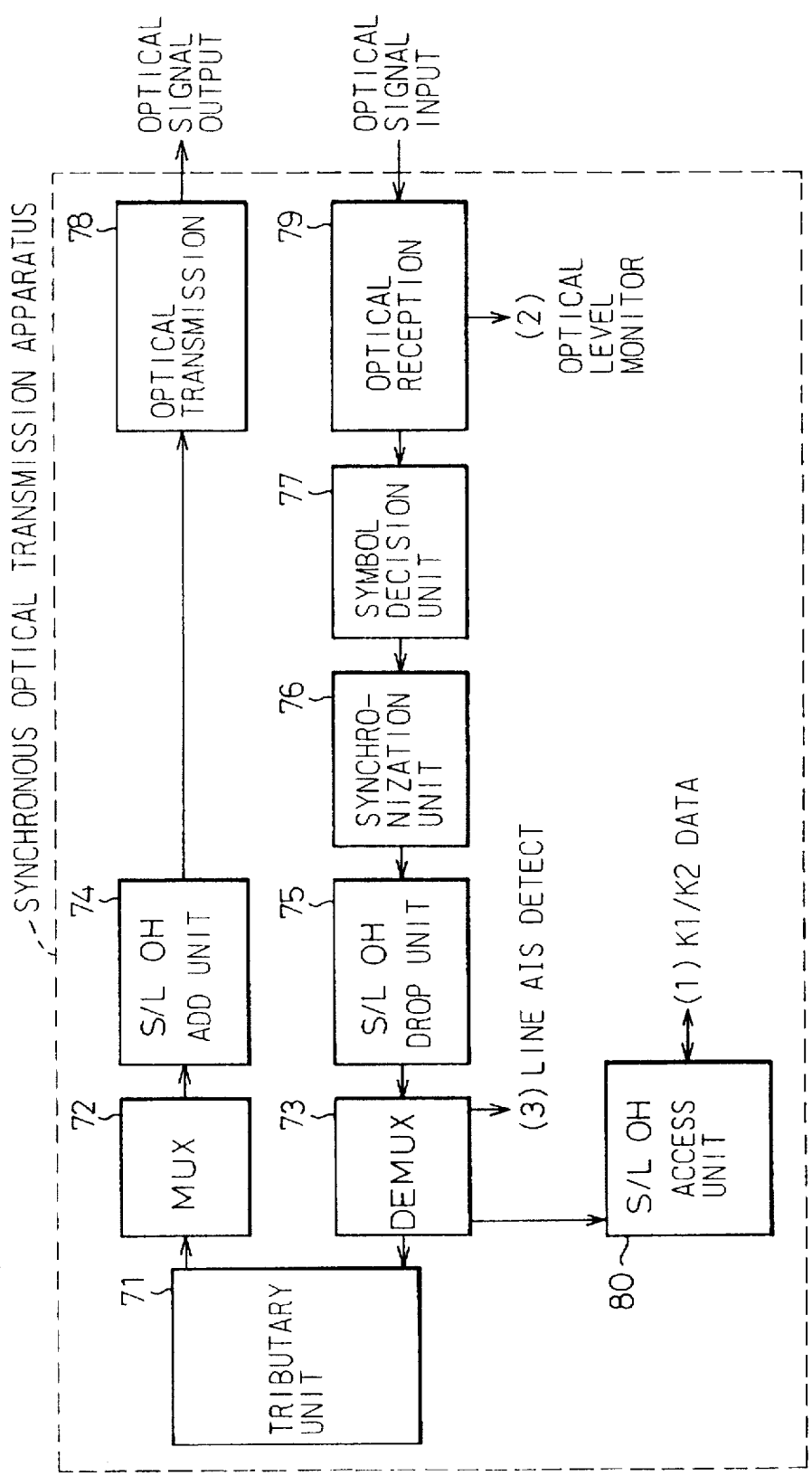
FIG. 13 is a diagram illustrating a typical construction of the optical transmission apparatus.

First Variation of First Embodiment
(FIG. 13)

There are several variations in the operations of the data storage and comparison unit 65. In the first variation, the above data storage and comparison unit 65 is replaced with a K1/K2 byte monitor unit (not shown) which monitors the K1 and K2 bytes in the line overhead (LOH) in received transmission frames, instead of the above insertion and comparison of the line break detection data. The K1 and K2 bytes are provided for transmitting switch commands for control of automatic protection switching of an optical transmission line between optical transmission apparatuses. The definition of the functions of the K1 and K2 bytes is explained, for example, in ANSI T1.105 for the SONET system.

The K1 and K2 bytes can be extracted by the usual synchronous optical transmission apparatus. A typical construction of the optical transmission apparatus is indicated in FIG. 13. In FIG. 13, reference numeral 71 denotes a tributary unit, 72 denotes a multiplexer, 73 denotes a demultiplexer, 74 denotes a section and line overhead add unit, 75 denotes a section and line overhead drop unit, 76 denotes a synchronization unit, 77 denotes a symbol decision unit, 78 denotes an optical transmission unit, 79 denotes an optical reception unit, and 80 denotes a section and line overhead access unit. Since the construction of FIG. 13 is well known, the functions of all of the respective elements in FIG. 13 are not explained. Only the functions relating to the operations of obtaining information used in the various variations of the embodiments of the present invention, are described. In FIG. 13, the received optical signals are converted to electric signals in the optical reception unit 79. In addition, in the optical reception unit 79, the level of the optical signal input is monitored. When the level of the optical signal input is lowered to a predetermined threshold level, the optical reception unit 79 outputs an alarm signal indicating a loss of an optical input. The symbols represented by the electric signals are determined in the symbol decision unit 77 to obtain a series of received bits. In the synchronization unit 76, the frame phase of the received transmission frame is recognized. In the section and line overhead drop unit 75, the section overhead and the line overhead are dropped from the received transmission frame, and in the demultiplexer 73, the line AIS (Alarm Indication Signal) is extracted, and the K1 and K2 bytes are extracted by the section and line overhead access unit 80.

The above-mentioned K1/K2 byte monitor unit monitors the K1 and K2 bytes in the line overhead (LOH) in received transmission frames. When the K1/K2 byte monitor unit does not find in the K1 and K2 bytes a request for switching from the working-system optical transmission line to the protection-system optical transmission line, the optical switch control unit 66 maintains the electric signal 67 in the ON state, as indicated in FIG. 9. Therefore, the optical transmission unit and the optical reception unit are linked with the working-system optical transmission line. When the K1/K2 byte monitor unit finds in the K1 and K2 bytes a request for switching from the working-system optical transmission line to the protection-system optical transmission line, the K1/K2 byte monitor unit sends the request to the optical switch control unit 66. When the optical switch control unit 66 receives the request, the optical switch control unit 66 turns OFF the electric signal 67, as indicated in FIG. 10. Thus, the optical transmission unit and the optical reception unit are linked with the protection-system optical transmission line.

Second Variation of First Embodiment

In the second variation of the first embodiment of the present invention, the above data storage and comparison unit 65 is replaced with a loss-of-input monitor unit (not shown) which monitors a loss of the optical input. Namely the loss-of-input monitor unit monitors the above-mentioned alarm signal indicating a loss of an optical input, which is obtained, for example, from the optical reception unit 79 in the synchronous optical transmission apparatus of FIG. 13. When the loss-of-input monitor unit detects the loss of an optical input, this is also informed to the optical switch control unit 66. When the loss-of-input monitor unit does not detect the alarm of the loss of the optical input, the optical switch control unit 66 maintains the electric signal 67 in the ON state, as indicated in FIG. 9. Therefore, the optical transmission unit and the optical reception unit are linked with the working-system optical transmission line. When the loss-of-input monitor unit detects the alarm of the loss of the optical input, the loss-of-input monitor unit sends the information on the detection to the optical switch control unit 66. When the optical switch control unit 66 receives the information on the detection, the optical switch control unit 66 turns OFF the electric signal 67, as indicated in FIG. 10. Thus, the optical transmission unit and the optical reception unit are linked with the protection-system optical transmission line.

Third Variation of First Embodiment

In the third variation of the first embodiment of the present invention, the above data storage and comparison unit 65 is replaced with a line AIS monitor unit (not shown) which monitors the line AIS signal extracted from the received transmission frame, for example, by the demultiplexer 73 in the synchronous optical transmission apparatus of FIG. 13. When the line AIS monitor unit detects the line AIS signal, this is also informed to the optical switch control unit 66.

When the line AIS monitor unit does not detect the line AIS signal, the optical switch control unit 66 maintains the electric signal 67 in the ON state, as indicated in FIG. 9. Therefore, the optical transmission unit and the optical reception unit are linked with the working-system optical transmission line. When the line AIS monitor unit detects the line AIS signal, the line AIS monitor unit sends the information on the detection to the optical switch control unit 66. When the optical switch control unit 66 receives the information on the detection, the optical switch control unit 66 turns OFF the electric signal 67, as indicated in FIG. 10. Thus, the optical transmission unit and the optical reception unit are linked with the protection-system optical transmission line.

Fourth Variation of First Embodiment

In the fourth variation of the first embodiment of the present invention, the above data storage and comparison unit 65 is replaced with a switch instruction monitor unit (not shown) which monitors a switch instruction which is transmitted from a maintenance center (not shown) to the optical transmission apparatus. The switch instruction may be transmitted to the optical transmission apparatus by any means. Therefore, the construction for the transmission from the maintenance center to the optical transmission apparatus is not shown. When the switch instruction monitor unit detects the switch instruction, this is also informed to the optical switch control unit 66. When the switch instruction monitor unit does not detect the switch instruction, the optical switch control unit 66 maintains the electric signal 67 in the ON state, as indicated in FIG. 9. Therefore, the optical transmission unit and the optical reception unit are linked with the working-system optical transmission line. When the switch instruction monitor unit detects the switch instruction, the switch instruction monitor unit sends the information on the detection to the optical switch control unit 66. When the optical switch control unit 66 receives the information on the detection, the optical switch control unit 66 turns OFF the electric signal 67, as indicated in FIG. 10. Thus, the optical transmission unit and the optical reception unit are linked with the protection-system optical transmission line.

Figure 14:
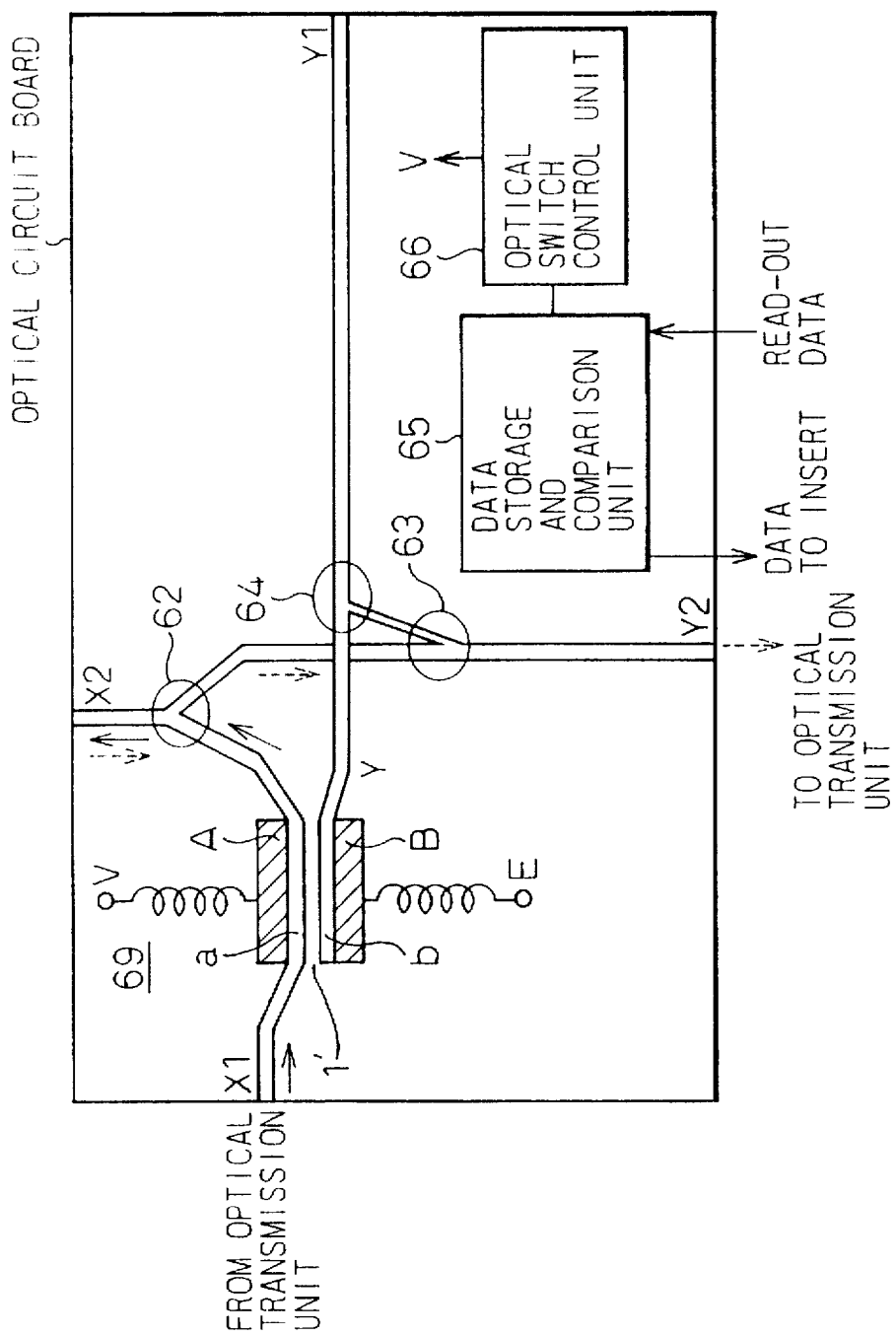
FIG. 14 is a diagram illustrating the construction of the second embodiment of the present invention, and the paths of the optical signals when the electric switch is OFF.
Figure 15:
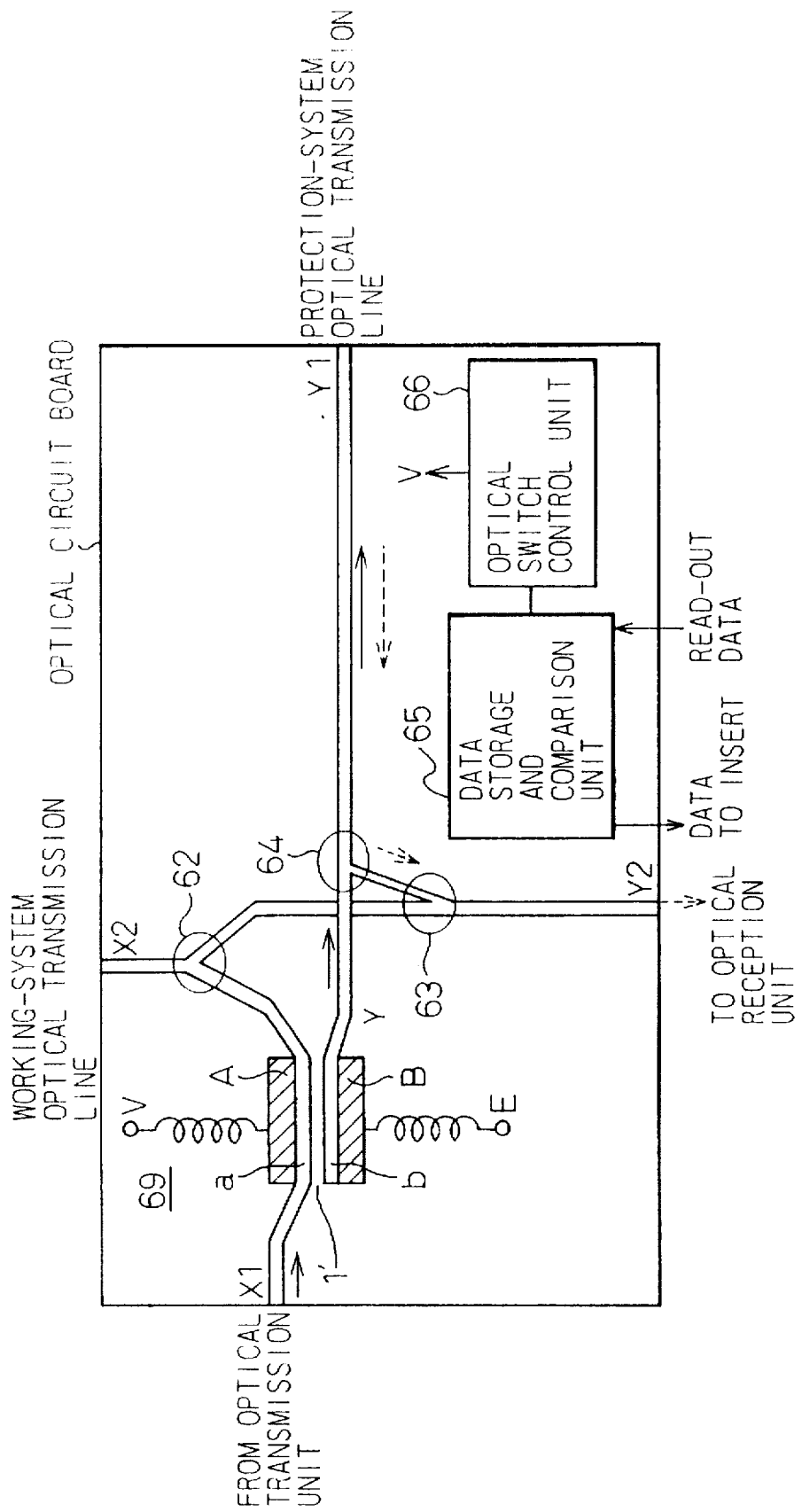

Second Embodiment
(FIGS. 14 and 15)

FIGS. 14 and 15 are diagrams illustrating the construction of the second embodiment of the present invention. The second embodiment also realizes the first aspect of the present invention. FIG. 14 shows the paths of the optical signals when the optical transmission unit and the optical reception unit are linked with the working-system optical transmission line, and FIG. 10 shows the paths of the optical signals when the optical transmission unit and the optical reception unit are linked with the protection-system optical transmission line. In the construction of FIGS. 14 and 15, the liquid-crystal-type optical switch in the construction of FIGS. 9 and 10 is replaced with the waveguide-type optical switch 69, and all of the other constructions are the same as the first embodiment. In addition, all of the variations explained for the first embodiment can also be realized in the second embodiment.

Figure 16:
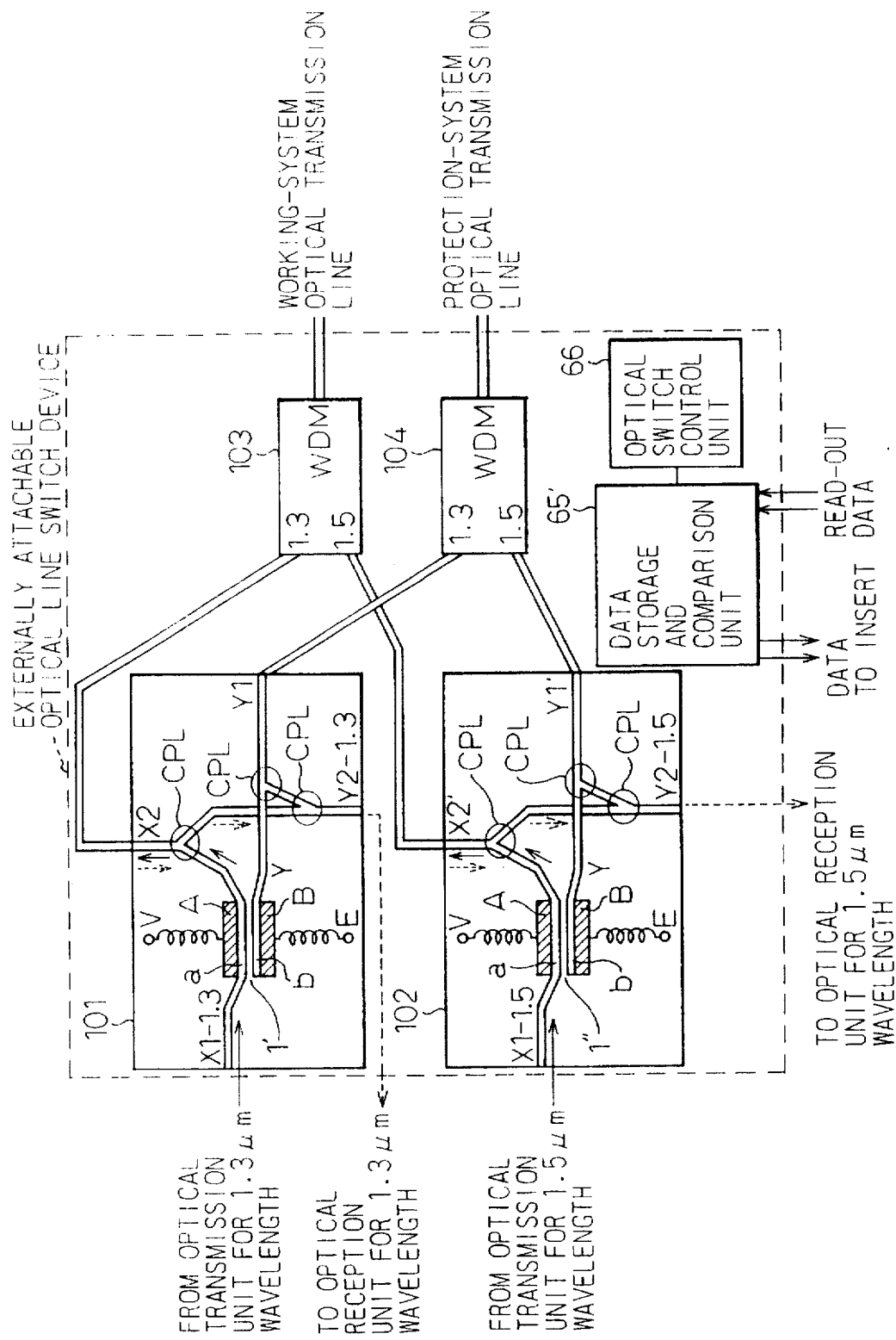
FIG. 16 is a diagram illustrating the construction of the third embodiment of the present invention.

Third Embodiment
(FIG. 16)

FIG. 16 is a diagram illustrating the construction of an externally attachable optical line switch device as the third embodiment of the present invention. The third embodiment realizes the second aspect of the present invention. In FIG. 16, reference numeral 101 denotes a first switch unit, 102 denotes a second switch unit, 103 denotes a first wavelength division multiplex and demultiplex unit, 104 denotes a second wavelength division multiplex and demultiplex unit, 65' denotes a data storage and comparison unit, and 66 denotes an optical switch control unit.

In the construction of FIG. 16, an optical transmission unit (not shown) which transmits optical signals of 1.3 μm wavelength, is connected to the optical waveguide X1-1.3 of the first switch unit 101, an optical reception unit (not shown) which receives optical signals of 1.3 μm wavelength, is connected to the optical waveguide Y2-1.3 of the first switch unit 101, an optical transmission unit (not shown) which transmits optical signals of 1.5 μm wavelength, is connected to the optical waveguide X1-1.5 of the second switch unit 102, and an optical reception unit (not shown) which receives optical signals of 1.5 μm wavelength, is connected to the optical waveguide Y2-1.5 of the second switch unit 102.

The optical waveguide X2 of the first switch unit 101 is connected to the first optical input and output port of the first wavelength division multiplex and demultiplex unit 103, which inputs and outputs optical signals of 1.3 μm wavelength, the optical waveguide Y1 of the first switch unit 101 is connected to the first optical input and output port of the second wavelength division multiplex and demultiplex unit 104, which inputs and outputs optical signals of 1.3 μm wavelength, the optical waveguide X2' of the second switch unit 102 is connected to the second optical input and output port of the first wavelength division multiplex and demultiplex unit 103, which inputs and outputs optical signals of 1.5 μm wavelength, and the optical waveguide Y1' of the second switch unit 102 is connected to the second optical input and output port of the second wavelength division multiplex and demultiplex unit 104, which inputs and outputs optical signals of 1.5 μm wavelength.

The third optical input and output port of the first wavelength division multiplex and demultiplex unit 103 is connected with a working-system optical transmission line, and the third optical input and output port of the second wavelength division multiplex and demultiplex unit 104 is connected with a protection-system optical transmission line.

The first wavelength division multiplex and demultiplex unit 103 can receive through its first optical input and output port the optical signals of 1.3 μm wavelength from the optical waveguide X2 of the first switch unit 101, and receive its second optical input and output port the optical signals of 1.5 μm wavelength from the optical waveguide X2' of the second switch unit 102, and wavelength-division-multiplex these optical signals into wavelength-division-multiplexed signals to transmit the wavelength-division-multiplexed signals through its third optical input and output port onto the working-system optical transmission line. In addition, the first wavelength division multiplex and demultiplex unit 103 can receive wavelength-division-multiplexed signals through its third optical input and output port from the working-system optical transmission line, and wavelength-division-demultiplex the wavelength-division-multiplexed signals into optical signals of 1.3 μm wavelength and optical signals of 1.5 μm wavelength. The optical signals of 1.3 μm wavelength are output through its first optical input and output port to the optical waveguide X2 of the first switch unit 101, and the optical signals of 1.5 μm wavelength are output through its second optical input and output port to the optical waveguide X2' of the second switch unit 102.

Similarly, the second wavelength division multiplex and demultiplex unit 104 can receive through its first optical input and output port the optical signals of 1.3 μm wavelength from the optical waveguide Y1 of the first switch unit 101, and receive its second optical input and output port the optical signals of 1.5 μm wavelength from the optical waveguide Y1' of the second switch unit 102, and wavelength-division-multiplex these optical signals into wavelength-division-multiplexed signals to transmit the wavelength-division-multiplexed signals through its third optical input and output port onto the protection-system optical transmission line. In addition, the second wavelength division multiplex and demultiplex unit 104 can receive wavelength-division-multiplexed signals through its third optical input and output port from the protection-system optical transmission line, and wavelength-division-demultiplex the wavelength-division-multiplexed signals into optical signals of 1.3 μm wavelength and optical signals of 1.5 μm wavelength. The optical signals of 1.3 μm wavelength are output through its first optical input and output port to the optical waveguide Y1 of the first switch unit 101, and the optical signals of 1.5 μm wavelength are output through its second optical input and output port to the optical waveguide Y1' of the second switch unit 102.

Each of the switch units 101 and 102 has the same construction as the optical line switch device according to the first aspect of the present invention. The first switch unit 101 switches the path of the optical signals of 1.3 μm wavelength, between the link with the first optical input and output port of the first wavelength division multiplex and demultiplex unit 103 and the first optical input and output port of the second wavelength division multiplex and demultiplex unit 104, and the second switch unit 102 switches the path of the optical signals of 1.5 μm wavelength, between the link with the second optical input and output port of the first wavelength division multiplex and demultiplex unit 103 and the second optical input and output port of the second wavelength division multiplex and demultiplex unit 104.

The data storage and comparison unit 65' in FIG. 16 performs the same functions as the data storage and comparison unit 65 in the construction of FIGS. 9 and 10, for each of the optical signals of 1.3 μm wavelength and the optical signals of 1.5 μm wavelength. When the data storage and comparison unit 65' detects the abnormality in either the optical signals of 1.3 μm wavelength or the optical signals of 1.5 μm wavelength, the detection is informed to the optical switch control unit 66, and the optical switch control unit 66 switches the paths in each of the first and second switch units 101 and 102. Alternatively, the data storage and comparison unit 65' and the optical switch control unit 66 in FIG. 16 can be constructed so that when abnormality is detected in the optical signals of 1.3 μm wavelength, only the path in the first switch unit 101 is switched, and that when abnormality is detected in the optical signals of 1.5 μm wavelength, only the path in the second switch unit 102 is switched. In addition, all of the variations explained for the first embodiment can also be realized in the third embodiment by replacing the data storage and comparison unit 65' with the various monitor units, respectively.

Figure 17:
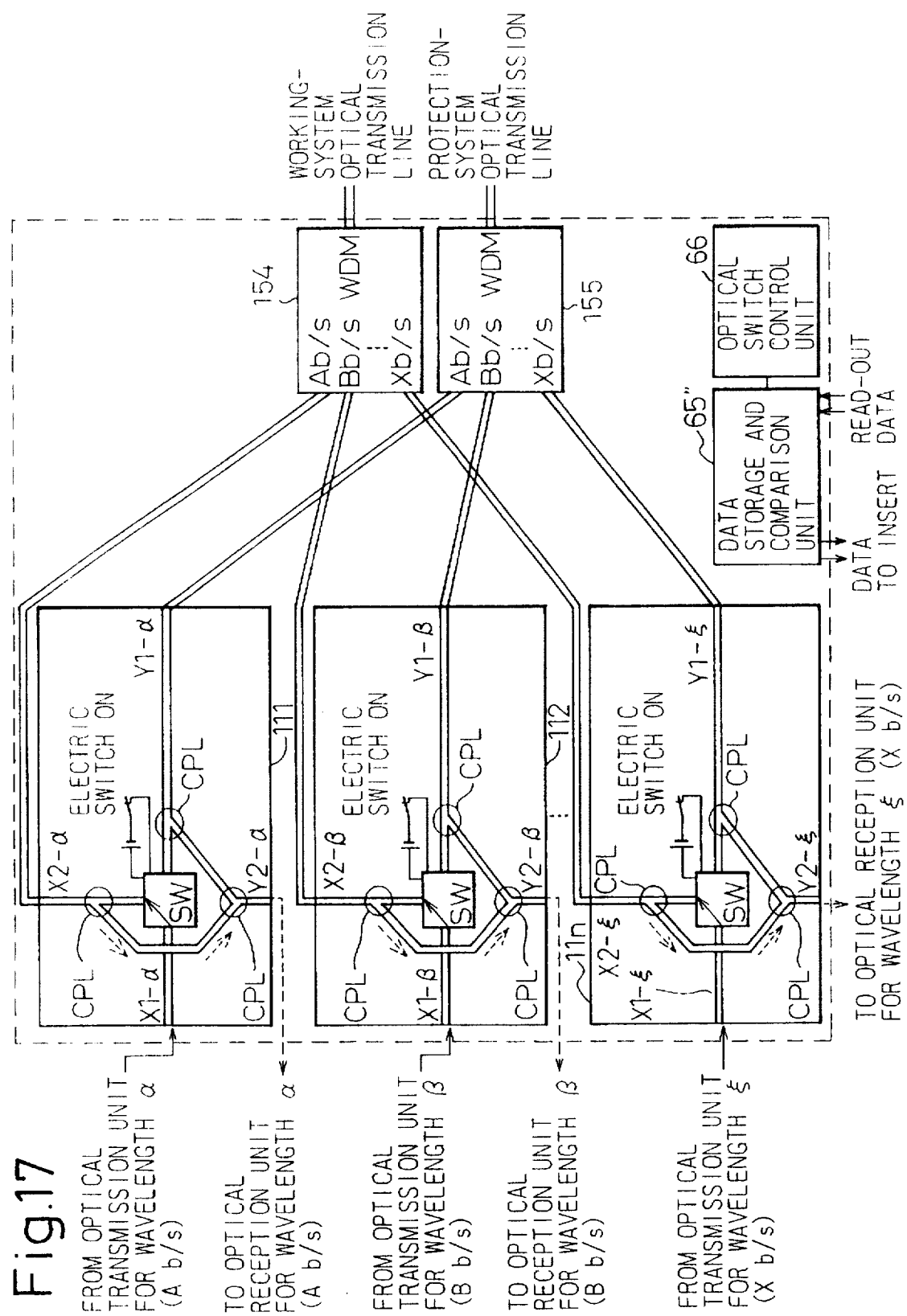
FIG. 17 is a diagram illustrating the construction of the fourth embodiment of the present invention.

Fourth Embodiment
(FIG. 17)

FIG. 17 is a diagram illustrating the construction of the fourth embodiment of the present invention. The fourth embodiment also realizes the second aspect of the present invention. In FIG. 17, reference numerals 111 ... 11n denote first to nth switch units, respectively, 154 denotes a first wavelength division multiplex and demultiplex unit, 155 denotes a second wavelength division multiplex and demultiplex unit, 65" denotes a data storage and comparison unit, and 66 denotes an optical switch control unit.

The plurality of switch units 111 ... 11n are provided corresponding to a plurality of wavelengths α μm, β μm, ... ξ μm of optical signals.

In the construction of FIG. 17, an optical transmission unit (not shown) which transmits optical signals of the wavelength α μm and the bit rate A bit/sec, is connected to the optical waveguide X1-α of the first switch unit 111, and an optical reception unit (not shown) which receives optical signals of the wavelength α μm and the bit rate A bit/sec, is connected to the optical waveguide Y2-α of the first switch unit 111. An optical transmission unit (not shown) which transmits optical signals of the wavelength β μm and the bit rate B bit/sec, is connected to the optical waveguide X1-β of the second switch unit 112, and an optical reception unit (not shown) which receives optical signals of the wavelength β μm and the bit rate B bit/sec, is connected to the optical waveguide Y2-β of the second switch unit 112. An optical transmission unit (not shown) which transmits optical signals of the wavelength ξ μm and the bit rate X bit/sec, is connected to the optical waveguide X1-ξ of the nth switch unit 11n, and an optical reception unit (not shown) which receives optical signals of the wavelength ξ μm and the bit rate X bit/sec, is connected to the optical waveguide Y2-ξ of the nth switch unit 11n.

The optical waveguide X2-α of the first switch unit 111 is connected to the first optical input and output port of the first wavelength division multiplex and demultiplex unit 154, which inputs and outputs optical signals of the wavelength α μm and the bit rate A bit/sec. The optical waveguide Y1-α of the first switch unit 111 is connected to the first optical input and output port of the second wavelength division multiplex and demultiplex unit 155, which inputs and outputs optical signals of the wavelength α μm and the bit rate A bit/sec. The optical waveguide X2-β of the second switch unit 112 is connected to the second optical input and output port of the first wavelength division multiplex and demultiplex unit 154, which inputs and outputs optical signals of the wavelength β μm and the bit rate B bit/sec. The optical waveguide Y1-β of the second switch unit 112 is connected to the second optical input and output port of the second wavelength division multiplex and demultiplex unit 155, which inputs and outputs optical signals of the wavelength β μm and the bit rate B bit/sec. The optical waveguide X2-ξ of the nth switch unit 11n is connected to the nth optical input and output port of the first wavelength division multiplex and demultiplex unit 154, which inputs and outputs optical signals of the wavelength ξ μm and the bit rate X bit/sec. The optical waveguide Y1-ξ of the nth switch unit 11n is connected to the nth optical input and output port of the second wavelength division multiplex and demultiplex unit 155, which inputs and outputs optical signals of the wavelength ξ μm and the bit rate X bit/sec.

The (n+1)-th optical input and output port of the first wavelength division multiplex and demultiplex unit 154 is connected with a working-system optical transmission line, and the (n+1)-th optical input and output port of the second wavelength division multiplex and demultiplex unit 155 is connected with a protection-system optical transmission line.

The first wavelength division multiplex and demultiplex unit 154 can receive through its first to nth optical input and output ports the optical signals of the wavelengths α μm, β m, ... ξ μm from the first to nth switch units 111, 112, ... 11n, respectively, and wavelength-division-multiplex these optical signals into wavelength-division-multiplexed signals to transmit the wavelength-division-multiplexed signals through its (n+1)-th optical input and output port onto the working-system optical transmission line. In addition, the first wavelength division multiplex and demultiplex unit 154 can receive wavelength-division-multiplexed signals through its (n+1)-th optical input and output port from the working-system optical transmission line, and wavelength-division-demultiplex the wavelength-division-multiplexed signals into optical signals of the wavelengths α μm, β μm, ... ξ μm. The optical signals of the wavelength α μm and the bit rate A bit/sec are output through its first optical input and output port to the optical waveguide X2-α of the first switch unit 111, the above optical signals of the wavelength β μm and the bit rate B bit/sec are output through its second optical input and output port to the optical waveguide X2-β of the second switch unit 112, and the above optical signals of the wavelength ξ μm and the bit rate X bit/sec are output through its nth optical input and output port to the optical waveguide X2-ξ of the nth switch unit 11n.

Similarly, the second wavelength division multiplex and demultiplex unit 155 can receive through its first to nth optical input and output ports the optical signals of the wavelengths α μm, β μm, ... ξ μm from the first to nth switch units 111, 112, ... 11n, respectively, and wavelength-division-multiplex these optical signals into wavelength-division-multiplexed signals to transmit the wavelength-division-multiplexed signals through its (n+1)-th optical input and output port onto the protection-system optical transmission line. In addition, the second wavelength division multiplex and demultiplex unit 155 can receive wavelength-division-multiplexed signals through its (n+1)-th optical input and output port from the protection-system optical transmission line, and wavelength-division-demultiplex the wavelength-division-multiplexed signals into optical signals of the wavelengths α μm, β μm, ... ξ μm. The optical signals of the wavelength α μm and the bit rate A bit/sec are output through its first optical input and output port to the optical waveguide Y1-α of the first switch unit 111, the above optical signals of the wavelength β μm and the bit rate B bit/sec are output through its second optical input and output port to the optical waveguide Y1-β of the second switch unit 112, and the above optical signals of the wavelength ξ μm and the bit rate X bit/sec are output through its nth optical input and output port to the optical waveguide Y1-ξ of the nth switch unit 11n.

Each of the switch units 111, 112, ... 11n has the same construction as the optical line switch device according to the first aspect of the present invention. The first switch unit 111 switches the path of the optical signals of the wavelength α μm and the bit rate A bit/sec, between the link with the first optical input and output port of the first wavelength division multiplex and demultiplex unit 154 and the first optical input and output port of the second wavelength division multiplex and demultiplex unit 155. The second switch unit 112 switches the path of the optical signals of the wavelength β μm and the bit rate B bit/sec, between the link with the second optical input and output port of the first wavelength division multiplex and demultiplex unit 154 and the second optical input and output port of the second wavelength division multiplex and demultiplex unit 155. The nth switch unit 11n switches the path of the optical signals of the wavelength ξ μm and the bit rate X bit/sec, between the link with the nth optical input and output port of the first wavelength division multiplex and demultiplex unit 154 and the nth optical input and output port of the second wavelength division multiplex and demultiplex unit 155.

The data storage and comparison unit 65" in FIG. 17 performs the same functions as the data storage and comparison unit 65 in the construction of FIGS. 9 and 10, for each of the optical signals of the wavelengths α μm, β μm, ... ξ μm, respectively. When the data storage and comparison unit 65" detects the abnormality in either of the optical signals of the wavelengths α μm, β μm, ... ξ μm, the detection is informed to the optical switch control unit 66, and the optical switch control unit 66 switches the paths in all of the first to nth switch units 111, 112 ... 11n. Alternatively, the data storage and comparison unit 65" and the optical switch control unit 66 in FIG. 17 can be constructed so that when abnormality is detected in the optical signals of one of the wavelengths α μm, β μm, ... ξ μm, only the path in one of the first to nth switch units 111, 112 ... 11n, corresponding to the above one of the wavelengths, is switched. In addition, all of the variations explained for the first embodiment can also be realized in the fourth embodiment by replacing the data storage and comparison unit 65" with the various monitor units, respectively.

Figure 18:
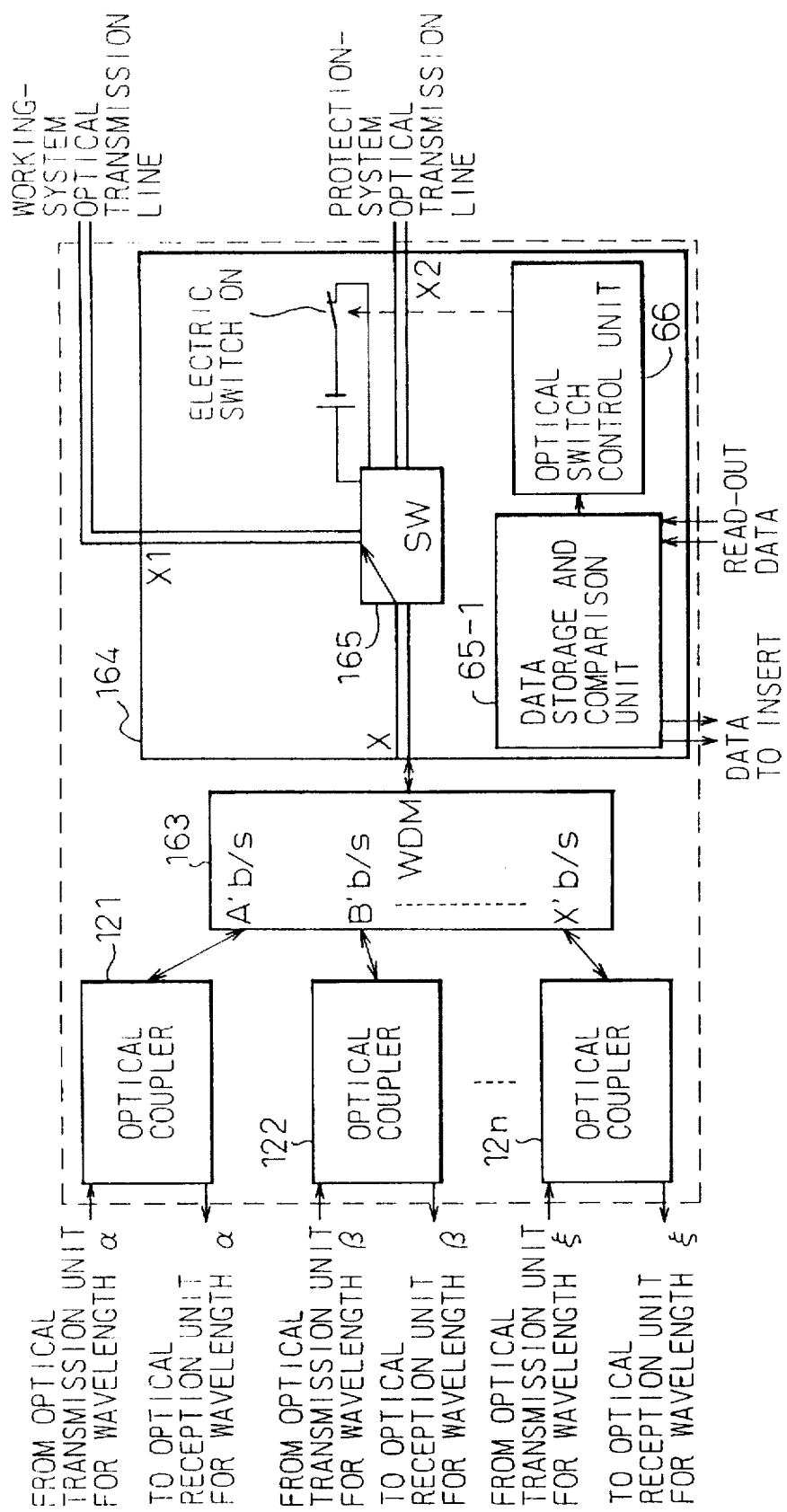
FIG. 18 is a diagram illustrating the construction of the fifth embodiment of the present invention.

Fifth Embodiment
(FIG. 18)

FIG. 18 is a diagram illustrating the construction of the fifth embodiment of the present invention. The fifth embodiment also realizes the third aspect of the present invention. In FIG. 18, reference numerals 121 ... 12n each denote an optical coupling and branching unit, 163 denotes a wavelength division multiplex and demultiplex unit, and 164 denotes a switch unit. In the switch unit 164, reference numeral 165 denotes an optical switch, 65-1 denotes a data storage and comparison unit, and 66 denotes an optical switch control unit.

In the construction of FIG. 18, the plurality of optical coupling and branching units 121 ... 12n are provided corresponding to of a plurality of wavelengths α μm, β μm, ... ξ μm, respectively, and each of the plurality of optical coupling and branching units 121 ... 12n has an optical input and output port, an optical input port, and an optical output port. Each of the plurality of optical coupling and branching units 121 ... 12n receives optical signals of one of the plurality of wavelengths corresponding to the optical coupling and branching unit, through the optical input port from an optical transmission unit (not shown) in an optical transmission apparatus, and outputs the received optical signals through the optical input and output port to the wavelength division multiplex and demultiplex unit 163. In addition, each of the plurality of optical coupling and branching units 121 ... 12n receives optical signals of one of the plurality of wavelengths corresponding to the optical coupling and branching unit, through the optical input and output port from the wavelength division multiplex and demultiplex unit 163, and outputs the received optical signals through the optical output port to an optical reception unit (not shown) in the optical transmission apparatus.

The wavelength division multiplex and demultiplex unit 163 has a plurality of optical input and output ports corresponding to the plurality of wavelengths α μm, β μm, ... ξ μm, respectively. Each of the plurality of optical input and output ports corresponding to one of the plurality of wavelengths is connected to the above optical input and output port of one of the plurality of optical coupling and branching units 121 ... 12n corresponding to the same wavelength. The wavelength division multiplex and demultiplex unit 163 has another optical input and output port for wavelength-division-multiplexed signals, which is connected with an optical input and output port X of the switch unit 164.

The wavelength division multiplex and demultiplex unit 163 can receive through the above plurality of optical input and output ports the optical signals of the wavelengths α μm, β μm, ... ξ μm from the plurality of optical coupling and branching units 121 ... 12n, respectively, and wavelength-division-multiplex these optical signals into wavelength-division-multiplexed signals to output the wavelength-division-multiplexed signals through the above optical input and output port for wavelength-division-multiplexed optical signals, to the switch unit 164. In addition, the wavelength division multiplex and demultiplex unit 163 can receive wavelength-division-multiplexed signals through the above optical input and output port for wavelength-division-multiplexed optical signals, from the switch unit 164, and wavelength-division-demultiplex the wavelength-division-multiplexed signals into plurality of optical signals of the wavelengths α μm, β μm, ... ξ μm. The optical signals of one of the plurality of wavelengths are output through one of the plurality of optical input and output ports corresponding to the same wavelength, to one of the plurality of optical coupling and branching units 121 ... 12n corresponding to the same wavelength.

The switch unit 164 connects the optical input and output port for wavelength-division-multiplexed signals, of the wavelength division multiplex and demultiplex unit 163 with one of the working-system optical transmission line and the protection-system optical transmission line. When the electric switch in the switch unit 164 is turned ON, the optical switch 165 establishes a path between the optical waveguide X and the optical waveguide X1, which is connected to the working-system optical transmission line. When the electric switch in the switch unit 164 is turned OFF, the optical switch 165 establishes a path between the optical waveguide X and the optical waveguide X2, which is connected to the protection-system optical transmission line. As in the all of the other embodiments, the electric switch is controlled by the optical switch control unit 66 based on the information supplied from the data storage and comparison unit 65-1.

The data storage and comparison unit 65-1 in FIG. 18 performs the same functions as the data storage and comparison unit 65 in the construction of FIGS. 9 and 10, for each of the optical signals of the wavelengths α μm, β μm, ... ξ μm, respectively. When the data storage and comparison unit 65-1 detects the abnormality in either of the optical signals of the wavelengths α μm, β μm, ... ξ μm, the detection is informed to the optical switch control unit 66, and the optical switch control unit 66 switches the path in the switch unit 164. In addition, all of the variations explained for the first embodiment can also be realized in the fifth embodiment by replacing the data storage and comparison unit 65-1 with the various monitor units, respectively.

Figure 19:
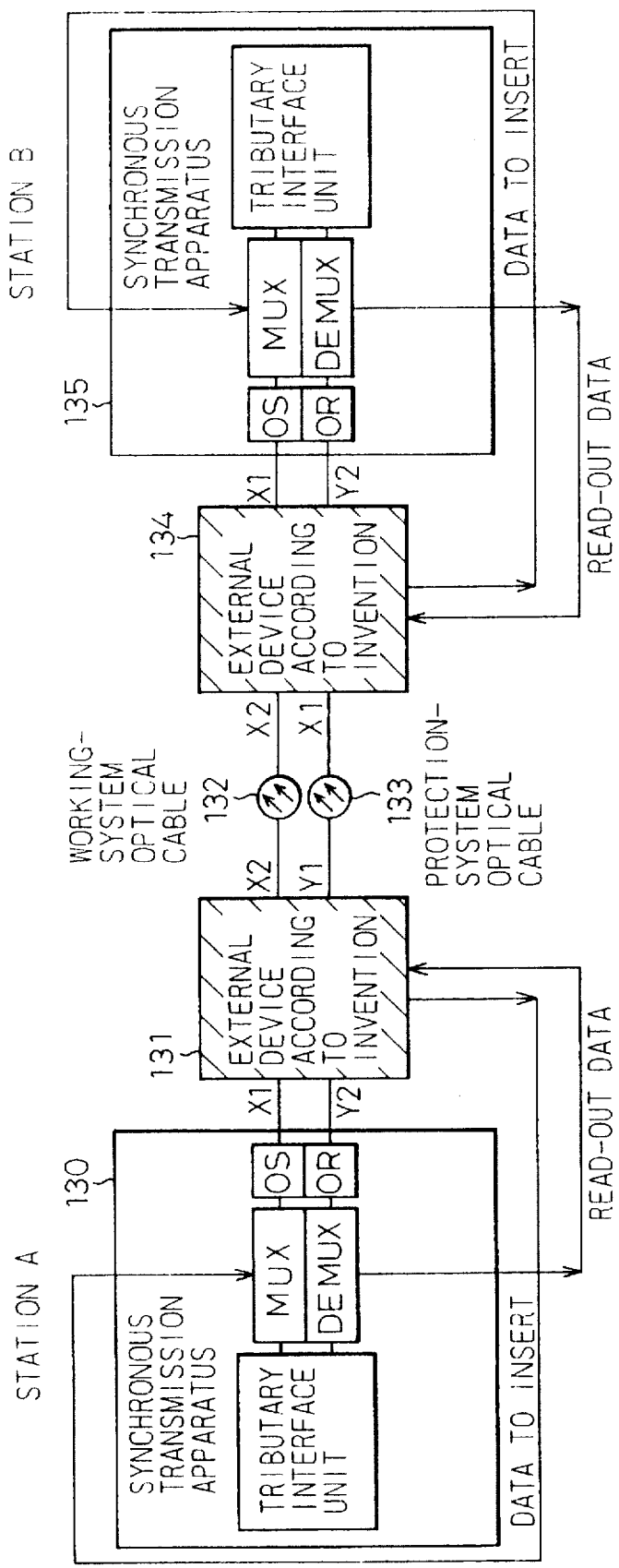
FIG. 19 is a diagram illustrating an example construction of a bidirectional optical transmission system in which the optical line switch device according to the first aspect of the present invention is used.

Use of Optical Line Switch Device
(FIGS. 19 and 20)

FIG. 19 is a diagram illustrating an example construction of a bidirectional optical transmission system in which the optical line switch device according to the first aspect of the present invention is used. In FIG. 19, reference numerals 130 and 135 each denote an optical transmission apparatus, 131 denotes an externally-attachable optical line switch device which is attached to the optical transmission apparatus 130, 132 denotes a working-system optical transmission line, 133 denotes a protection-system optical transmission line, and 134 denotes an externally-attachable optical line switch device which is attached to the optical transmission apparatus 135. In each of the optical transmission apparatuses 130 and 135, OS denotes an optical transmission unit, OR denotes an optical reception unit, MUX denotes a multiplexer, and DMUX denotes a demultiplexer.

As indicated in FIG. 19, by only attaching the optical line switch device according to the first aspect of the present invention, to the optical transmission apparatus which is not designed for containing the doubled optical transmission line, the optical transmission apparatus becomes able to contain the doubled optical transmission line without modifying the optical transmission apparatus.

FIG. 20 is a diagram illustrating an example construction of a bidirectional optical transmission system in which the optical line switch device according to the second or third aspect of the present invention is used. In FIG. 20, reference numeral 140 denotes an optical transmission apparatus for transmitting and receiving optical signals of 1.3 µm wavelength in the station A, 141 denotes an optical transmission apparatus for transmitting and receiving optical signals of 1.5 µm wavelength in the station A, 142 denotes an externally-attachable optical line switch device which is attached to the optical transmission apparatuses 140 and 141 in the station A, 143 denotes a working-system optical transmission line linking the stations A and B, 144 denotes a protection-system optical transmission line linking the stations A and B, 145 denotes an externally-attachable optical line switch device which is attached to optical transmission apparatuses 146 and 147 in the station B, 146 denotes the optical transmission apparatus for transmitting and receiving optical signals of 1.3 µm wavelength in the station B, and 147 denotes the optical transmission apparatus for transmitting and receiving optical signals of 1.5 µm wavelength in the station B. In each of the optical transmission apparatuses 140, 141, 146, and 147, OS 1.3 denotes an optical transmission unit for transmitting optical signals of 1.3 µm wavelength, OS 1.5 denotes an optical transmission unit for transmitting optical signals of 1.5 µm wavelength, OR denotes an optical reception unit of 1.3 µm wavelength, OR 1.5 denotes an optical reception unit for receiving optical signals of 1.5 µm wavelength, MUX denotes a multiplexer, and DMUX denotes a demultiplexer.

As indicated in FIG. 20, by only attaching the optical line switch device according to the second or third aspect of the present invention, to the optical transmission apparatuses which are provided corresponding to a plurality of wavelengths and are not designed for containing the doubled optical transmission line transmitting wavelength-division-multiplexed optical signals, the optical transmission apparatuses become able to contain the doubled optical transmission line transmitting wavelength-division-multiplexed optical signals, without modifying the respective optical transmission apparatus.

In addition, since no modification of the conventional optical transmission apparatus is required in attaching thereto the optical line switch devices according to the present invention, and only information usually available from the conventional optical transmission apparatus is used for controlling the optical switch, the optical line switch devices according to the present invention can be attached to conventional optical transmission apparatuses supplied by any manufacturer.

Further, by using the optical line switch device according to the present invention, optical transmission apparatuses which are not designed for a doubled transmission system, can easily upgraded to optical transmission apparatuses for a doubled transmission system at low cost.

I claim:

1. An optical line switch device comprising:
   an optical switch;
   first and second optical coupling and branching units; and
   an optical coupling unit;
   said optical switch when input with a first optical signal, supplying the first optical signal to one of the first and second optical coupling and branching units according to a switch control signal, which is applied to the optical switch;

each of said first and second optical coupling and branching units outputting the first optical signal when the first optical signal is supplied thereto, when input a second optical signal, each optical coupling and branching unit supplying the second optical signal to the optical coupling unit; and said optical coupling unit outputting the second optical signal when the second optical signal is supplied thereto.

2. An optical line switch device comprising:
   an optical switch having a first input port and first and second output ports, an optical signal input through the first input port, being output through one of the first and second output ports in response to a switch control signal which is applied to the optical switch;

a first optical coupling and branching unit, having a second input port connected to the first output port, a third output port, and a first input and output port, an optical signal input through the second input port being output through the first input and output port, an optical signal input through the first input and output port, being output through the third output port;

an optical coupling unit, having a third input port connected with the third optical output port, a fourth input port, and a fourth output port, an optical signal input through one of the third and fourth input ports being output through the fourth output port; and a second optical coupling and branching unit, having a fifth output port connected with the fourth input port, a fifth input port connected with the second output port, and a second input and output port, an optical signal input through the fifth input port being output through the second input and output port, an optical signal input through the second input and output port being output through the fifth output port.

3. An optical line switch device according to claim 2, further comprising,
   a cause-to-switch detecting unit for detecting a cause which requires a path in the optical switch to be switched to another path, and
   a switch control unit for controlling the optical switch by outputting the switch control signal in response to detection of the cause by the cause-to-switch detecting unit.

4. An optical line switch device according to claim 3, wherein each of said first and second input and output ports is connected with an optical transmission line;
   said optical line switch device further comprises a monitor signal output unit for outputting a predetermined signal as a monitor signal from the optical line switch device onto the optical transmission line, and
   said cause-to-switch detecting unit inputs a monitor signal transmitted through the optical transmission line, and detects as said cause that the monitor signal input thereto is the same as said predetermined signal.

5. An optical line switch device according to claim 3, wherein each of said first and second input and output ports is connected with an optical transmission line;
   said optical line switch device further comprises a monitor signal output unit for outputting a first predetermined signal as a monitor signal from the optical line switch device onto the optical transmission line, and said cause-to-switch detecting unit inputting a monitor signal which is transmitted through the optical transmission line, and detecting as said cause that the monitor signal input thereto is not a second predetermined signal which is different from the first predetermined signal.

6. An optical line switch device according to claim 3, wherein said cause-to-switch detecting unit inputs switch control information which indicates a path for an optical signal to be established in the optical switch, and detects the switch control information as said cause when the cause-to-switch detecting unit inputs switch control information which indicates a path different from a path established previously in the optical switch.

7. An optical line switch device according to claim 6, wherein the optical signal which is input through each of the first and second input and output ports contains an overhead signal, and said switch control information is contained in the overhead signal.

8. An optical line switch device according to claim 3, wherein said cause-of-switch detecting unit inputs switch control information which instructs the optical line switch device to switch the path in the optical switch to said other path, and detects the switch control information as said cause when the cause-to-switch detecting unit inputs the switch control information.

9. An optical line switch device according to claim 8, wherein the optical signal which is input through each of the first and second input and output ports contains an overhead signal, and said switch control information is contained in the overhead signal.

10. An optical line switch device according to claim 3, wherein the optical signal which is input through each of the first and second input and output ports contains an overhead signal including alarm information which indicates a condition of the optical transmission line through which the optical signal is transmitted, and said cause-to-switch detecting unit detects the alarm information as said cause when the alarm information indicates a faulty condition of the optical transmission line.

11. An optical line switch device according to claim 3, wherein said cause-to-switch detecting unit inputs a loss-of-input signal which indicates that no optical signal is output from the fourth output port, and detects as the cause that the cause-to-switch detecting unit inputs the loss-of-input signal.

12. An optical line switch device according to claim 2, wherein said optical switch is a liquid-crystal-type optical switch.

13. An optical line switch device according to claim 2, wherein said optical switch is a waveguide-type optical switch.

14. An optical line switch device comprising:

a plurality of optical line switch units corresponding to a plurality of wavelengths, respectively; and first and second wavelength division multiplex and demultiplex units;

each of said plurality of optical line switch units comprises, an optical switch having a first input port and first and second output ports, an optical signal input through the first input port, being output through one of the first and second output ports in response to a switch control signal which is applied to the optical switch;

a first optical coupling and branching unit, having a second input port connected to the first output port, a third output port, and a first input and output port, an optical signal input through the second input port being output through the first input and output port, an optical signal input through the first input and output port, being output through the third output port;

an optical coupling unit, having a third input port connected with the third optical output port, a fourth input port, and a fourth output port, an optical signal input through one of the third and fourth input ports being output through the fourth output port; and a second optical coupling and branching unit, having a fifth output port connected with the fourth input port, a fifth input port connected with the second output port, and a second input and output port, an optical signal input through the fifth input port being output through the second input and output port, an optical signal input through the second input and output port being output through the fifth output port;

said first wavelength division multiplex and demultiplex unit having a plurality of third input and output ports corresponding to the plurality of wavelengths, and a fourth input and output port, a plurality of first optical signals of the plurality of wavelengths input through the plurality of third input and output ports, respectively, being wavelength-division-multiplexed into a first wavelength-division-multiplexed optical signal, the first wavelength-division-multiplexed optical signal being output through the fourth input and output port, a second wavelength-divisiondemultiplexed optical signal input through the fourth input and output port being wavelength-divisionmultiplexed into a plurality of second optical signals of the plurality of wavelengths, the plurality of second optical signals being output through the plurality of third input and output ports corresponding to the plurality of wavelengths of the second optical signals, respectively;

said second wavelength division multiplex and demultiplex unit having a plurality of fifth input and output ports corresponding to the plurality of wavelengths, and a sixth input and output port, a plurality of third optical signals of the plurality of wavelengths input through the plurality of fifth input and output ports, respectively, being wavelength-division-multiplexed into a third wavelength-division-multiplexed optical signal, the third wavelength-division-multiplexed optical signal being output through the sixth input and output port, a fourth wavelength-division-multiplexed optical signal input through the sixth input and output port being wavelength-division-demultiplexed into a plurality of fourth optical signals of the plurality of wavelengths, the plurality of fourth optical signals being output through the plurality of fifth input and output ports corresponding to the plurality of wavelengths of the fourth optical signals, respectively;

each of said plurality of third input and output ports corresponding to one of the plurality of wavelengths, being connected to the first input and output port of one of the plurality of optical line switch units corresponding to the same one of the wavelengths; and each of said plurality of fifth input and output ports corresponding to one of the plurality of wavelengths, being connected to the second input and output port of one of the plurality of optical line switch units corresponding to the same one of the wavelengths.

15. An optical line switch device according to claim 14, further comprising,
- a cause-to-switch detecting unit for detecting a cause which requires switching a path in the optical switch in each of the plurality of optical line switch units to another path, and
- a switch control unit for controlling the optical switch in each of the plurality of optical line switch units by outputting the switch control signal in response to the detection of the cause by the cause-to-switch detecting unit.

16. An optical line switch device according to claim 15, wherein each of said fourth and sixth input and output ports is connected with an optical transmission line;
- said optical line switch device further comprises a monitor signal output unit for outputting a predetermined signal as a monitor signal from the optical line switch device onto the optical transmission line, and
- said cause-to-switch detecting unit inputs a monitor signal transmitted through the optical transmission line, and detects as said cause that the monitor signal input thereto is the same as said predetermined signal.

17. An optical line switch device according to claim 15, wherein each of said fourth and sixth input and output ports is connected with an optical transmission line;
- said optical line switch device further comprises a monitor signal output unit for outputting a first predetermined signal as a monitor signal from the optical line switch device onto the optical transmission line, and
- said cause-to-switch detecting unit inputs a monitor signal which is transmitted through the optical transmission line, and detects as said cause that the monitor signal input thereto is not a second predetermined signal which is different from the first predetermined signal.

18. An optical line switch device according to claim 15, wherein said cause-to-switch detecting unit inputs switch control information which indicates which path for an optical signal should be established in the optical switch, and detects the switch control information as said cause when the cause-to-switch detecting unit inputs the switch control information which indicates a path different from a path established previously in the optical switch.

19. An optical line switch device according to claim 18, wherein the optical signal which is input through each of the fourth and sixth input and output ports contains an overhead signal, and said switch control information is contained in the overhead signal.

20. An optical line switch device according to claim 15, wherein said cause-to-switch detecting unit inputs switch control information which instructs the optical line switch device to switch the path in the optical switch in each of the plurality of optical line switch units to said other path, and detects the switch control information as said cause when the cause-to-switch detecting unit inputs the switch control information.

21. An optical line switch device according to claim 20, wherein the optical signal which is input through each of the fourth and sixth input and output ports contains an overhead signal, and said switch control information is contained in the overhead signal.

22. An optical line switch device according to claim 15, wherein the optical signal which is input through each of the fourth and sixth input and output ports contains an overhead signal, and the overhead signal contains alarm information which indicates a condition of the optical transmission line through which the optical signal is transmitted, and said cause-to-switch detecting unit detects the alarm information as said cause when the alarm information indicates a faulty condition of the optical transmission line.

23. An optical line switch device according to claim 15, wherein said cause-to-switch detecting unit inputs a loss-of-input signal which indicates that no optical signal is output from the fourth output port in at least one of the plurality of optical line switch units, and detects as the above cause that the cause-of-switch detecting unit inputs the loss-to-input signal.

24. An optical line switch device according to claim 14, wherein said optical switch is a liquid-crystal-type optical switch.

25. An optical line switch device according to claim 14, wherein said optical switch is a waveguide-type optical switch.

26. An optical line switch device comprising:
- a wavelength division multiplex and demultiplex unit, having a plurality of first input and output ports corresponding to a plurality of wavelengths and a second input and output port, a plurality of first optical signals of the plurality of wavelengths input through the plurality of first input and output ports, respectively, being wavelength-division-multiplexed into a first wavelength-division-multiplexed optical signal, the first wavelength-division-multiplexed optical signal being output through the second input and output port, a second wavelength-division-multiplexed optical signal input though the second input and output port, being wavelength-division-demultiplexed into a plurality of second optical signals of the plurality of wavelengths, and the plurality of second optical signals being output through the plurality of first input and output ports corresponding to the plurality of wavelengths of the second optical signals, respectively;
- a plurality of optical coupling and branching units corresponding to the plurality of wavelengths, respectively, each of the optical coupling and branching units having a third input and output port, an input port, and an output port, an optical signal input from the input port being output from the third input and output port, an optical signal input from the third input and output port being output from the output port, and the third input and output port of each of the optical coupling and branching units corresponding to one of the wavelengths, being connected with one of the plurality of first input and output ports corresponding to the same one of the wavelengths; and
- an optical switch, having a fourth input and output port connected with the second input and output port, and fifth and sixth input and output ports, an optical signal input through the fourth input and output port being output through one of the fifth and sixth input and output ports according to a switch control signal which is applied to the optical switch, an optical signal input through one of the fifth and sixth input and output ports being output through the fourth input and output port.

27. An optical line switch device according to claim 26, further comprising,
- a cause-to-switch detecting unit for detecting a cause which requires a path in the optical switch to be switched to another path, and
- a switch control unit for controlling the optical switch by outputting the switch control signal in response to detection of the cause by the cause-to-switch detecting unit.

28. An optical line switch device according to claim 27, wherein each of said fifth and sixth input and output ports is connected with an optical transmission line;

said optical line switch device further comprises a monitor signal output unit for outputting a predetermined signal as a monitor signal from the optical line switch device onto the optical transmission line, and said cause-to-switch detecting unit inputs a monitor signal transmitted through the optical transmission line to the optical line switch device, and detects as said cause that the monitor signal is the same as said predetermined signal.

29. An optical line switch device according to claim 27, wherein each of said fifth and sixth input and output ports is connected with an optical transmission line;

said optical line switch device further comprises a monitor signal output unit for outputting a first predetermined signal as a monitor signal from the optical line switch device onto the optical transmission line, and said cause-to-switch detecting unit inputs a monitor signal which is transmitted through the optical transmission line to the optical line switch device, and detects as said cause that the monitor signal input thereto is not a second predetermined signal which is different from the first predetermined signal.

30. An optical line switch device according to claim 27, wherein said cause-to-switch detecting unit inputs switch control information which indicates which path for an optical signal should be established in the optical switch, and detects the switch control information as said cause when the cause-to-switch detecting unit inputs switch control information which indicates a path different from a path established previously in the optical switch.

31. An optical line switch device according to claim 30, wherein the optical signal which is input through each of the fifth and sixth input and output ports contains an overhead signal, and said switch control information is contained in the overhead signal.

32. An optical line switch device according to claim 27, wherein said cause-to-switch detecting unit inputs switch control information which instructs the optical line switch device to switch the path in the optical switch to said other path, and detects the switch control information as said cause when the cause-to-switch detecting unit inputs the switch control information.

33. An optical line switch device according to claim 32, wherein the optical signal which is input through each of the fifth and sixth input and output ports contains an overhead signal, and said switch control information is contained in the overhead signal.

34. An optical line switch device according to claim 27, wherein the optical signal which is input through each of the fifth and sixth input and output ports contains an overhead signal, and the overhead signal contains alarm information which indicates a condition of the optical transmission line through which the optical signal is transmitted, and said cause-to-switch detecting unit detects the alarm information as said cause when the alarm information indicates a faulty condition of the optical transmission line.

35. An optical line switch device according to claim 27, wherein said cause-to-switch detecting unit can input a loss-of-input signal which indicates that no optical signal is output from the output port in at least one of the plurality of optical coupling and branching units, and detects as the above cause that the cause-to-switch detecting unit inputs the loss-of-input signal.

36. An optical line switch device according to claim 26, wherein said optical switch is a liquid-crystal-type optical switch.

37. An optical line switch device according to claim 26, wherein said optical switch is a waveguide-type optical switch.

* * * * *